United States Patent
Brennan et al.

(10) Patent No.: US 6,357,549 B1
(45) Date of Patent: Mar. 19, 2002

(54) GUIDE RAIL CLIMBING LIFTING PLATFORM AND METHOD

(75) Inventors: Donald D. Brennan, Lancaster; Brent R. Leisening, Lititz; Carl W. Diedrich, Lancaster; George M. Burkhart, Millersville, all of PA (US); Ralph Douglas Fredrickson, St. Cloud, MN (US)

(73) Assignees: D. H. Blattner & Sons, Inc., Avon, MN (US); Elgood Mayo Corp., Lancaster, PA (US)

( * ) Notice: Subject to any disclaimer, the term of this patent is extended or adjusted under 35 U.S.C. 154(b) by 0 days.

(21) Appl. No.: 09/586,013

(22) Filed: Jun. 2, 2000

Related U.S. Application Data
(60) Provisional application No. 60/137,321, filed on Jun. 3, 1999.

(51) Int. Cl.[7] ................................................ A63B 27/00
(52) U.S. Cl. ........................ 182/133; 182/19; 182/103; 52/745.01
(58) Field of Search ................................. 182/101, 102, 182/103, 19, 82, 43, 133, 141; 52/745; 187/19

(56) References Cited

U.S. PATENT DOCUMENTS

| | | |
|---|---|---|
| 946,010 A | 1/1910 | Callahan |
| 1,013,886 A | 1/1912 | McCune |
| 1,880,125 A | 9/1932 | Ewing |
| 2,511,023 A | 6/1950 | Thomas |
| 2,796,299 A | 6/1957 | Freeman |
| 2,983,341 A | 5/1961 | Selberg et al. |
| 3,327,437 A | 6/1967 | Rush |
| 3,672,115 A | 6/1972 | Abe et al. .................... 52/741 |
| 3,811,579 A * | 5/1974 | Black ........................ 214/38 D |
| 4,028,792 A | 6/1977 | Tax et al. ..................... 29/431 |
| 4,054,014 A | 10/1977 | van der Lely ................ 52/745 |
| 4,231,148 A | 11/1980 | Harding ....................... 29/469 |
| 4,231,200 A | 11/1980 | Henderson ................... 52/111 |
| 4,266,911 A | 5/1981 | Helm et al. .................... 416/9 |
| 4,272,929 A | 6/1981 | Hanson ......................... 52/40 |
| 4,274,542 A | 6/1981 | Barclay ...................... 212/270 |
| 4,337,014 A | 6/1982 | Farnham .................... 414/332 |
| 4,467,889 A | 8/1984 | Maubach et al. ........... 182/103 |
| 4,516,663 A | 5/1985 | D'Alessio et al. ........... 187/19 |
| 4,550,806 A * | 11/1985 | Bocker ......................... 187/10 |
| 4,580,377 A | 4/1986 | Sundin ........................ 52/121 |
| 4,620,486 A * | 11/1986 | Gronau et al. .............. 102/121 |
| 4,797,055 A * | 1/1989 | Tworoger et al. ........... 414/283 |
| 5,086,605 A | 2/1992 | Tzincoca ..................... 52/745 |
| 5,146,096 A | 9/1992 | McConachy ................. 290/44 |
| 5,182,458 A | 1/1993 | McConachy ................. 290/55 |
| 5,247,776 A | 9/1993 | Tamayo ....................... 52/745 |
| 5,299,913 A | 4/1994 | Heidelberg ................. 416/197 |
| 5,450,695 A | 9/1995 | Desai .......................... 52/118 |
| 5,452,774 A | 9/1995 | Davis et al. ................ 187/270 |
| 5,490,364 A | 2/1996 | Desai et al. ................. 52/637 |
| 5,680,925 A * | 10/1997 | Gallagher et al. ........ 198/861.1 |
| 5,960,502 A | 10/1999 | Sherman et al. ............. 14/77.1 |
| 5,995,063 A | 11/1999 | Somoza et al. ............. 343/890 |
| 6,028,566 A | 2/2000 | Pennell et al. ............. 343/878 |
| 6,053,286 A * | 4/2000 | Balmer ....................... 187/201 |

* cited by examiner

*Primary Examiner*—Bruce A. Lev
(74) *Attorney, Agent, or Firm*—Vidas, Arrett and Steinkraus

(57) ABSTRACT

A guide rail system is used to erect towers, to place equipment on towers and for maintenance of towers. The guide rail may be added to existing towers, a climbing lifting platform is attached to the guide rails and is used to transport items up and down the tower. The platform may also be used to carry up tower sections during erection of the tower.

13 Claims, 16 Drawing Sheets

GUIDE RAIL CLIMBING LIFTING PLATFORM AND METHOD

CROSS-REFERENCE TO RELATED APPLICATIONS

This appln claims benefit of Prov. No. 60/137,321 filed Jun. 3, 1999.

STATEMENT REGARDING FEDERALLY SPONSORED RESEARCH OR DEVELOPMENT

Not Applicable.

BACKGROUND OF THE INVENTION

The present invention relates to lifting devices and, more specifically, to a platform capable of both lifting heavy objects that are needed for elevated construction and facilitating the modular construction of tall structures.

Many construction projects require the moving of materials and machinery up hundreds of feet above the ground. Some examples of projects that would require the lifting of materials are the construction of office buildings or high rise apartment complexes. Often the construction of towers or industrial smokestacks, such as concrete towers or steel towers, requires the lifting of heavy modular units to complete construction. One example of a tower that requires a lifting device for both the modular construction of the tower and for lifting heavy machinery to the top of the tower is a wind turbine tubular tower. These wind turbine tubular towers can easily reach 300 feet in height and upon completion require the lifting of a wind turbine generator and rotor blade assembly to the top of the wind turbine tubular tower.

Different methods are commonly used when either constructing towers or lifting heavy objects to great heights. Often a large industrial crane is used to facilitate these sort of construction projects. The large industrial cranes can assist in lifting the various components needed for the modular assembly of construction projects. Additionally, large industrial cranes can also place heavy machinery on the top of towers as needed.

For loads over 120,000 pounds and heights over 300 feet few cranes currently exist that can be used on public roads at a reasonable expense. Unfortunately, there are disadvantages to relying on the use of large industrial cranes in some construction situations. Depending on the terrain, it may be difficult to place the crane in a suitable operational position. In some situations, there may not be enough room to either properly position the large industrial crane or even to move the crane to the project site. Wind turbine farms are just one example of a situation in which it is difficult to use a large industrial crane. Wind turbine farms usually have many wind turbine tubular towers placed in close proximity to each other to maximize the amount of energy that can be generated by the wind turbine farm. Often the roads throughout the wind turbine farm are too small to be used by a large industrial crane in order to erect additional wind turbine tubular towers. Furthermore, the use of a large industrial crane that has suitable height and load capabilities for either the assembly or repair of wind turbine tubular towers is often overly expensive.

Wind turbine farms may be scattered over many square miles. Large industrial cranes may be transported into such farms, but often must be disassembled and reassembled over and over in order to reach each of the wind tower locations. This loses valuable time and increases the costs tremendously.

The transportation of large industrial cranes through wind turbine farms also presents problems when existing wind turbine generators or existing wind turbine tubular towers need to be repaired. Wind turbine generators and wind turbine tubular towers are often struck by lightning that can damage the wind turbine generator or rotor blades, thus necessitating the repair or replacement of the wind turbine generator and parts of the wind turbine tubular tower.

High piers or towers, such as observatory towers, also require the use of lifting devices, such as cranes, to facilitate construction. However, the use of cranes is subject to many of the drawbacks detailed above.

Another method that can be utilized to facilitate the construction of towers is to use helicopters to lift modular components during the construction of the towers. The use of helicopters, however, is expensive and is often an impractical solution once budgetary concerns are considered.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The present invention provides a guide rail climbing lifting platform that overcomes the above drawbacks and provides a device that does not require as much physical space to access a project site. The guide rail climbing lifting platform is capable of supporting the tremendous weights necessary to facilitate the modular assembly of towers. Furthermore, the present invention is an ideal device for lifting heavy machinery to elevated points along tall structures. The inventive guide rail climbing lifting platform uses a hydraulic system to travel along guide rails that are attached to the side of a structure. The guide rails can either be an integral part of the structure or they can be attached to a structure using a retro-fitting process. The rails transfer the weight of the lifting platform and the payload directly to the base platform. The vertical load is not placed on the tower.

This guide rail climbing lifting platform allows more economical and efficient repairs to be made to existing towers due to the present invention's efficient design. The guide rail climbing lifting platform is a far less expensive option than using a comparable large industrial crane of similar lifting capabilities (measured in terms of the height to which an object can be lifted and in terms of the amount of weight that can be lifted).

Furthermore, the present invention is ideally suited for the construction and repair work that must be performed in wind turbine farms. The guide rail climbing lifting platform does not require large amounts of operational space proximate to the base of the tower. Furthermore, the guide rail climbing lifting platform can be transported along much smaller roads than large industrial cranes are capable of using.

Accordingly, the guide rail climbing lifting platform of the present invention provides both a convenient and economical way for erecting towers in a modular fashion and provides an economical way for lifting heavy machinery to points along a vertical structure.

BRIEF DESCRIPTION OF THE DRAWINGS

A detailed description of the invention is hereafter described with specific reference being made to the drawings in which:

FIG. 12 is a side elevational view of the guide rail climbing lifting platform of FIG. 1, shown in two positions, transporting the short tower segment and the nacelle of FIG. 11 to the top of the tower;

DETAILED DESCRIPTION OF THE INVENTION

Figure 1:
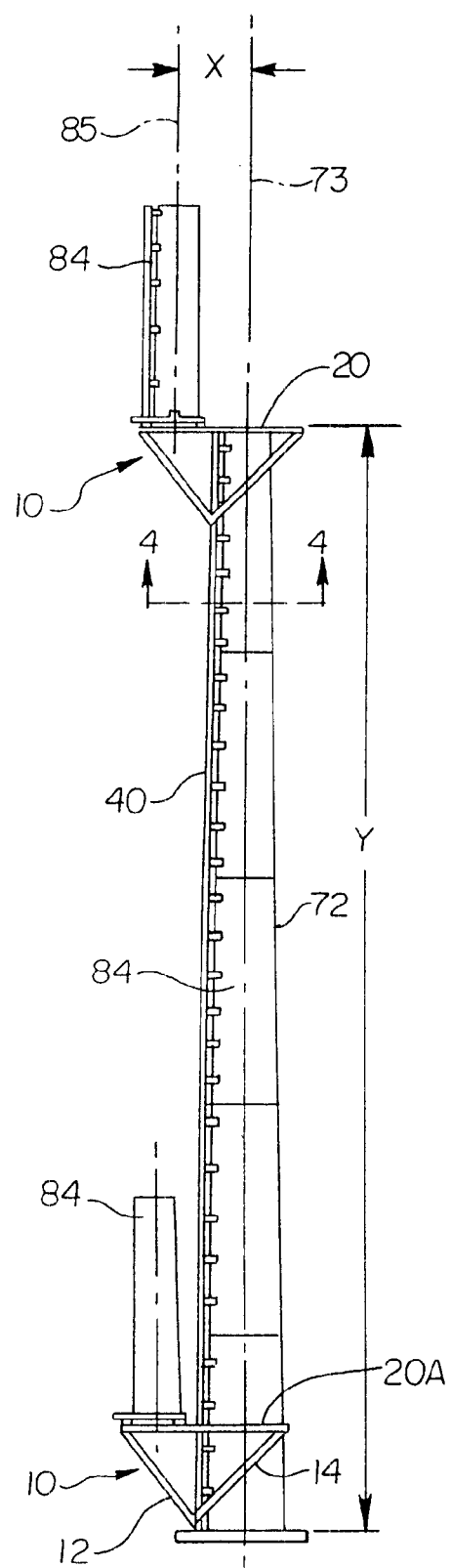
FIG. 1 is a side elevational view of a guide rail climbing lifting platform, shown at two different positions along a tower, in accordance with the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the guide rail climbing lifting platform assembly and designated parts thereof. The terminology includes the words above specifically mentioned, derivatives thereof and words of similar import.

In many instances only one of a pair of components that are recited is actually shown in FIGS. 1–13. When only one component (e.g. the first latch pin 46a) of a pair of recited components (e.g. the first and second latch pins 46a, 46b) is actually shown in the referenced figure, it is understood that the second component of the recited pair is symmetrically positioned on the opposite side of the platform assembly and that the second component operates in a similar fashion.

Referring to the drawings in detail, wherein in like numerals indicate like elements throughout, there is shown in FIGS. 1–21 a preferred embodiment of a guide rail climbing lifting platform, also referred to as a platform assembly, generally designated 10. The guide rail climbing lifting platform is an ideal device for erecting modular wind turbine tubular towers and for lifting heavy machinery or devices. As shown in FIG. 1 and discussed in more detail hereinafter, the platform assembly 10 can transport a tower segment 84 to the top of a steel tower 72. By incrementally moving upward along the guide rails 40, the platform assembly 10 is able to move from a lower position, shown at the bottom of FIG. 1, to an upper position, shown at the top of FIG. 1. Once the tower segment 84 is positioned at the upper end of the steel tower 72, the tower segment 84 is ready to be aligned over and attached to the steel tower 72. Thus the steel tower 72 can be formed using multiple tower segments 84, each of which can be anywhere from 40 to 50 feet long.

The guide rail climbing lifting device allows for the modular construction of towers without the use of a large heavy industrial crane. While a light crane (not shown) is necessary to place the tower segment 84 onto the platform assembly 10 shown at the bottom of FIG. 1, the size of the crane required is much smaller than that which would be necessary if the tower segment 84 were to be lifted by a crane directly to the top of the steel tower 72.

While in the drawings depicting the preferred embodiment a steel tower 72 is shown as being approximately 300 feet in height, it is understood by those of ordinary skill in the art from this disclosure that the present invention is not limited to towers of any particular height. Nor is the present invention limited to any particular size of the individual tower segments. For instance, the platform assembly 10 can be used to construct towers taller than 300 feet using individual tower segments 84 that are each 20 feet long. Additionally, the guide rail climbing lifting platform 10 can also be used with concrete towers.

Figure 5:
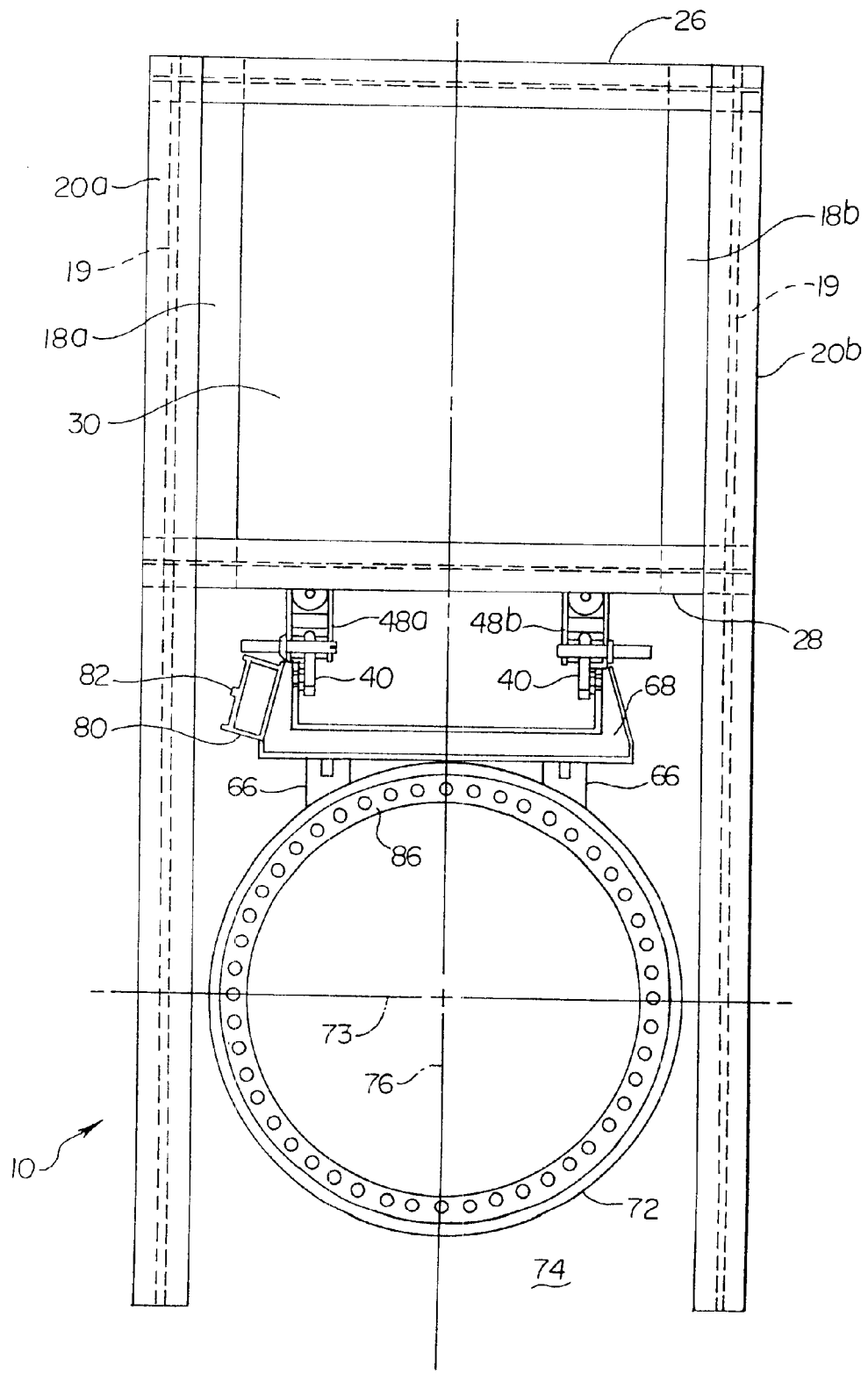
FIG. 5 is a top plan view of the guide rail climbing lifting platform positioned at the top of a partially constructed steel tower.

Referring now to FIGS. 1 and 5, the guide rail climbing lifting platform 10 supports the tower segment 84 on the left side of the steel tower 72 and has a first and a second carriage track 20a, 20b that each extend along opposite sides of the steel tower 72. In FIG. 1 only the first carriage track 20a can be seen. As the platform assembly 10 transports upwards along the guide rail 40 towards the top of the steel tower 72, the first and second carriage tracks 20a, 20b extend beyond the right side of the steel tower 72. Once the additional tower segment 84 has been brought to the top of the steel tower 72, the distance denoted "x" between the center line 85 of the tower segment 84 and the center line 73 of the steel tower 72 is approximately 10 feet. The distance "x" varies depending on the structure being climbed, the size of the guide rail climbing lifting platform, and the weight of the objects being lifted by the platform assembly 10.

Figure 3:
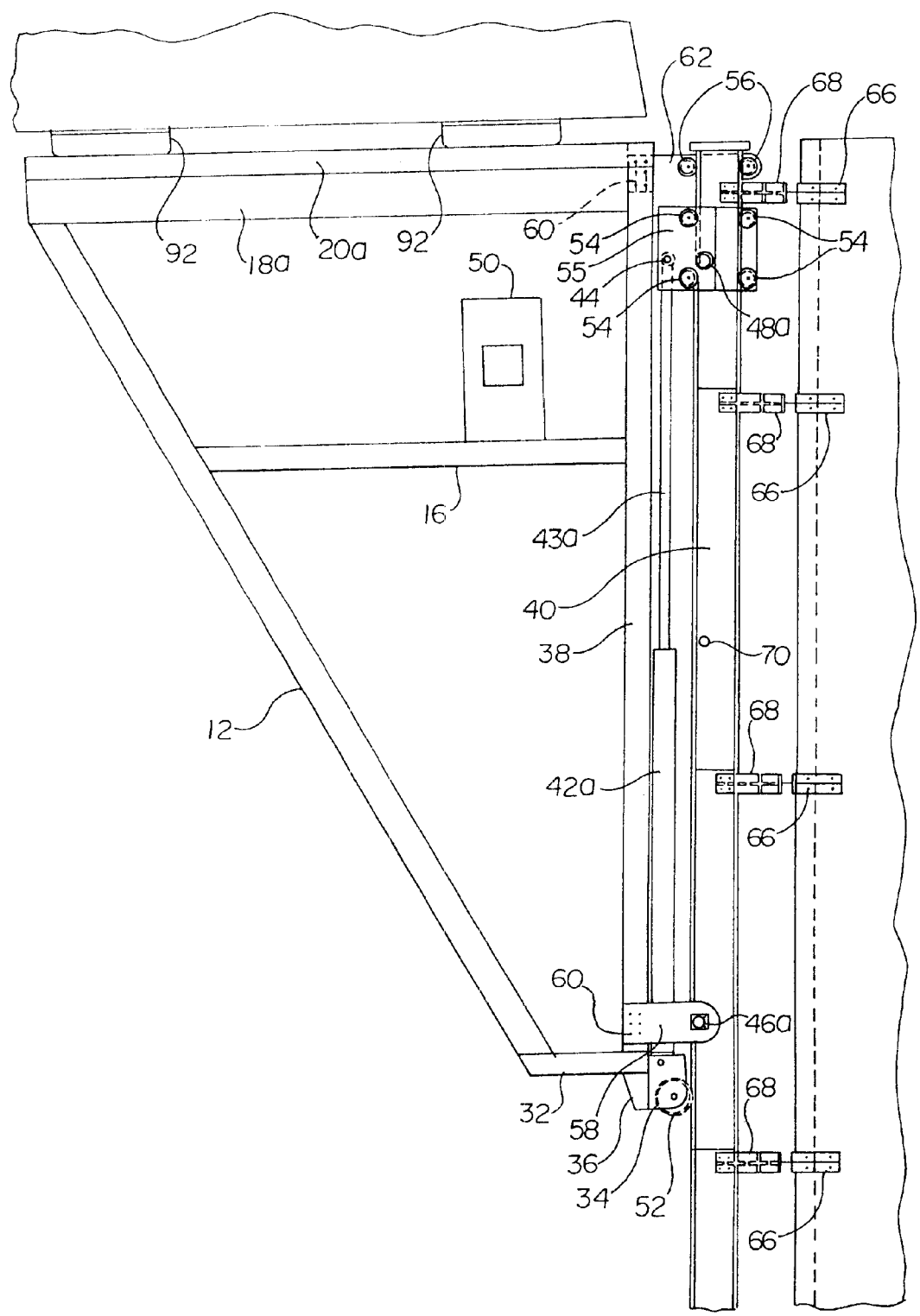
FIG. 3 is a greatly enlarged side elevational view of another portion of the guide rail climbing lifting platform of FIG. 1.

FIG. 3 shows a portion of the platform assembly 10. The guide rail climbing lifting platform assembly 10 has a first and a second carriage track 20a, 20b that do not extend past the guide rails 40. As such, the guide rail climbing lifting platform 10 of FIG. 3 is preferable for lifting machinery and objects upwards along structures that are wider than the upper portion of the platform assembly 10, such as apartment buildings, office buildings, aircraft hangers, stadiums, and warehouses.

Both types of the guide rail climbing lifting platform 10 use the same mechanisms to travel along the guide rails 40 and operate in a similar manner. As such, the climbing operation of both guide rail climbing lifting platforms 10 will be described with reference to the components shown in the guide rail climbing lifting platform of FIG. 3. The guide rail climbing lifting platform shown in FIGS. 1–13 and 18–21 also possesses and utilizes each of the components detailed in FIG. 3. The omission of some of these components in FIGS. 1–13 and 18–21 is only for the purpose of simplifying the figures.

Referring to FIG. 3, the operation of the platform assembly 10 is as follows. Initially, first and the second latch pins 46a, 46b are engaged with the guide rails 40. The lower end of the platform assembly 10 has a pair of lower wheels 52 that abut and roll along the guide rails 40. Each lower wheel 52 is rotatably mounted on a first cylinder support 34. Each first cylinder support 34 is secured to a lower deck 32 that extends therefrom. A vertical support or strut 38 extends upwardly generally parallel to the guide rails 40 from the end of the lower deck 32 closest to the guide rails 40. A lower flange 58 is attached in a cantilever fashion to an outer edge of each vertical support 38 using bolts 60 proximate to the lower deck 32. The distal end of the lower flange 58 includes an aperture for slidably receiving the respective latch pin 46a or 46b. The first and second latch pins 46a, 46b extend from the lower flange 58 into registry with a correspondingly sized pin receiving hole 70 in the guide rails 40. There are a series of pin receiving holes 70 spaced along the length of the guide rails 40 at predetermined intervals, as described in more detail hereinafter. The first and second latch pins 46a, 46b and the pin receiving holes 70 cooperate to fix the platform assembly 10 to the guide rails 40 at a selected vertical position, as is also described in more detail hereinafter.

The upper end of the platform assembly 10 is secured to the guide rails 40 using a pair of upper flanges 62. One upper flange 62 is attached to the upper end of each vertical support 38 and extends therefrom generally perpendicularly in a cantilever fashion. Each upper flange 62 is secured to its vertical support 38 via standard fasteners, such as bolts 60. The distal end of each upper flange 62 includes a pair of upper wheels 56 that sandwich its respective guide rail 40. That is, one upper wheel 56 is located on either side of a respective guide rail 40. Since the upper flanges 62 are braced via upper wheels 56 against both sides of the guide rails 40, the platform assembly 10 is maintained at a constant orientation relative to the guide rails 40. Additionally, the upper flanges 62, and the associated upper wheels 56, prevent the rotation of the platform assembly 10 around the lower flanges 58.

With reference to FIG. 3, the platform assembly 10 is also vertically fixed along the guide rails 40 by the first and second slide pins 48a, 48b, as described in more detail below. The first and second slide pins 48a, 48b are reciprocally mounted within a correspondingly sized aperture in first and second slide assemblies 55 that are separately mounted to roll along each of the guide rails 40. The first and second slide assemblies 55 are attached to the distal end of the first and second lift rods 43a, 43b, respectively. The first and second lift rods 43a, 43b extend from first and second lift cylinders 42a, 42b that are attached to the platform assembly 10 proximate to the lower deck 32.

While in the preferred embodiment the first and second lift cylinders 42a, 42b are pinned to the platform assembly 10 at cylinder support 34, it is understood from this disclosure that the present invention is not limited to the method of securing the first and second lift cylinders 42a, 42b to the platform assembly 10. For instance, the first and second lift cylinders 42a, 42b can be bolted to the platform assembly 10 at various locations along the platform assembly that would allow the first and second lift rods 43a, 43b to properly operate, as explained in more detail hereinafter.

The first and second lift rods 43a, 43b are attached to the first and second slide assemblies 55, respectively, via a pin connection 44. Each slide assembly 55 engages the guide rail 40 using four slide wheels 54 for each guide rail 40. Two slide wheels 54 are arranged on both sides of the guide rail 40 to maintain stability in the slide assembly 55. FIG. 3 shows the platform assembly after having secured the first and second slide pins 48a, 48b to the guide rails 40.

To begin the lifting process, with the first and second slide pins 48a, 48b locked to the guide rails 40, the first and second latch pins 46a, 46b are disengaged from the guide rails 40. Once the first and second latch pins 46a, 46b have been disengaged from the guide rails 40, the first and second lift rods 43a, 43b are retracted into the first and second lift cylinders 42a, 42b. This causes the platform assembly 10 to move in the upward direction, as viewed in FIG. 3. While moving upward, both the upper wheels 56 and the lower wheels 52 roll along the sides of the guide rails 40.

As the first and second lift rods 43a, 43b are retracted into the first and second lift cylinders 42a, 42b, the platform assembly 10 moves upwards until the first and second latch pins 46a, 46b are aligned with the next set of pin receiving holes 70 in the guide rails 40. Once the first and second latch pins 46a, 46b are aligned with the next set of pin receiving holes 70 in the guide rails 40, the first and second latch pins 46a, 46b are engaged with the pin receiving holes 70 in the guide rails 40. Thus, the platform assembly 10 is vertically supported by both the latch pins 46a, 46b and the slide pins 48a, 48b.

Next, the first and second slide pins 48a, 48b disengage from the guide rail 40 and the first and second lift cylinders 42a, 42b drive the first and second lift rods 43a, 43b upwards. This causes each slide assembly 55 to travel upward along the guide rails 40 until the slide pins 48a, 48b are aligned with the next set of pin receiving holes 70. The pairs of pin receiving holes 70 are preferably located approximately every 10 feet along the guide rails to correspond with the stroke distance of the first and second lift rods 43a, 43b. However, it is understood that the pin receiving holes 70 could be spaced along the guide rails 40 at other intervals so long as the distance of each interval is not greater than the stroke distance of the first and second lift cylinders 42a, 42b.

Then, once the first and second slide pins 48a, 48b are aligned with the next pair of pin receiving holes 70 in the guide rails 40, the first and second slide pins 48a, 48b are engaged with the guide rails 40. Thus, the platform assembly 10 is again supported by both the first and second latch pins 46a, 46b and by the first and second slide pins 48a, 48b. This sequence of operations is repeatedly performed until the platform assembly 10 reaches the desired position along the guide rails 40.

Figure 2:
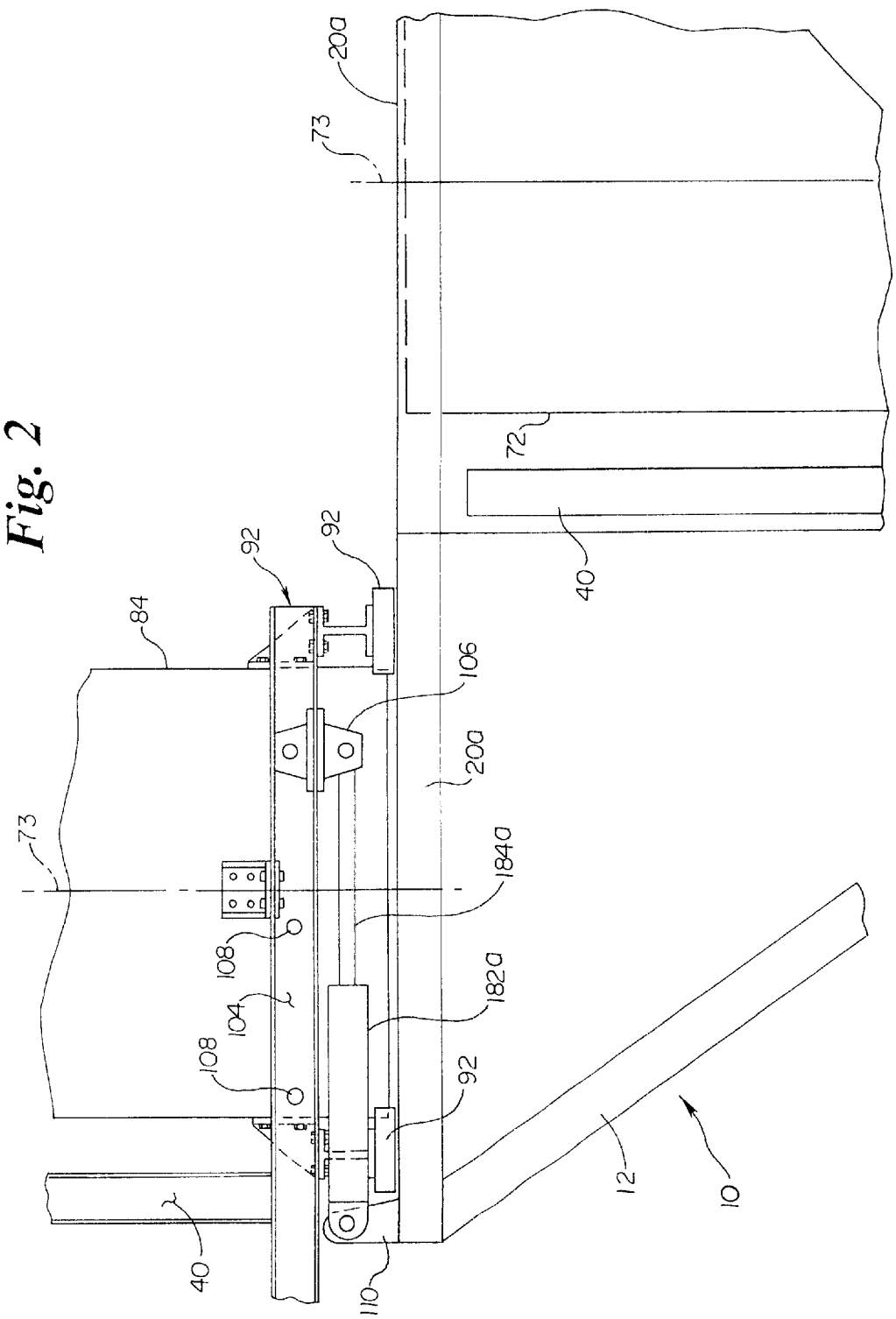
FIG. 2 is a greatly enlarged partial side elevational view of a portion of the guide rail climbing lifting platform of FIG. 1.

The top portion of the platform assembly 10, as viewed in FIG. 5, is formed using first and second lower support beams 18a, 18b to support and underlie each of the first and second carriage tracks 20a, 20b. As shown in FIG. 3, an equipment deck 16 is positioned inside of the platform assembly 10. The equipment deck 16 can be used to store supplies (not shown) and is also used to support a diesel powered pump unit 50 and certain components of a hydraulic system described below (not shown in FIG. 3). The left most side of the platform assembly 10, as viewed in FIGS. 1–3, is constructed using first and second side support beams 12. The first side support beam 12 is attached at one end to the lower deck 32 and at the opposite end to the first lower support beam 18a. The second side support beam 12 (not shown) is attached at one end to the lower deck 32 and at the opposite end to the second lower support beam 18b. Side support beams 14 are similar to beams 12 but are on the right most side of the platform of FIG. 1.

The structural components of the platform assembly 10 are preferably constructed of a high strength light weight material, such as steel, and joined in a manner well known to those of skill in the art, such as by fasteners or by welding. It is understood by those of ordinary skill in the art from this disclosure that the present invention is not limited to constructing the platform assembly 10 in any particular manner so long as it is capable of traversing the guide rails 40 and can support heavy loads.

The guide rails 40 are attached to the tower using a plurality of tower mounts 66 that are directly attached to the steel tower 72. The guide rail supports 68 are attached to the tower mounts 66. The guide rail supports 68 engage the guide rails 40 and stably maintain the guide rails 40 in an aligned position. As can be seen in FIG. 3, the guide rails 40 are preferably assembled in 10 feet segments when they are retrofit onto an existing tower. While the preferred embodiment uses guide rails 40 that are already attached to the tower that is being climbed by the platform assembly 10, it is understood by those of skill in the art that the present invention is not limited to use with towers having pre-existing guide rail structures. For instance, the platform assembly 10 can be used to incrementally install guide rails 40 in 10 feet increments along a pre-existing tower.

Figure 4:
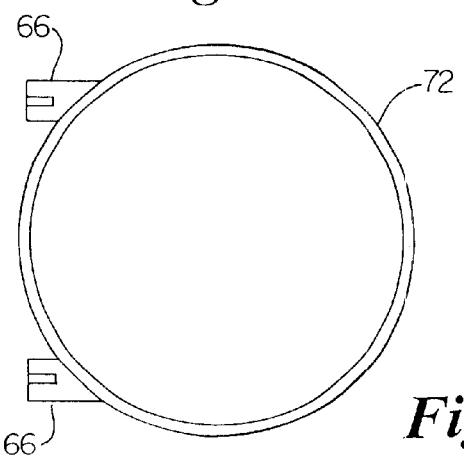
FIG. 4 is an enlarged cross-sectional view of a tower segment of FIG. 1 taken along the line 4—4 of FIG. 1.

As shown in FIG. 4, the tower mounts 66 can be directly formed or welded onto the steel tower 72. Furthermore, the guide rails 40, the guide rail supports 68, and the tower mounts 66 can be integrally constructed with the steel tower segments 84 to simplify the construction of the steel tower 72. While the preferred embodiment uses the platform assembly 10 to self erect steel towers, it is understood by those of ordinary skill in the art from this disclosure that the present invention is not limited to use with steel towers. For instance, the platform assembly 10 can be used with concrete towers, such as those that are used to form high piers, and can be used to construct observation towers, or other similar vertical structures. To attach tower mounts 66 to the concrete tower, inserts are formed in the concrete tower as the tower is being slip formed in a manner well understood by those of ordinary skill in the art (not shown). Then the tower mounts 66 are secured inside of the inserts (not shown).

When trying to retrofit steel towers for use with the guide rail climbing lifting platform 10, the guide rails 40 are attached by bolting the tower mounts directly to the steel tower. It is understood by those of ordinary skill in the art from this disclosure that the platform assembly 10 of the present invention can be used in a retrofit manner with existing towers regardless of the material with which the existing tower is constructed.

Referring to FIG. 5, a top plan view of the platform assembly 10 shows the platform assembly 10 attached to a partially constructed steel tower 72. The end of the tower segment 84 that forms the top of the partially constructed steel tower 72 has an inner flange 86. An inner flange 86 is located at both ends of each tower segment 84 to allow the various tower segments to be bolted together. Each inner flange 86 has a plurality of bolt holes 74 that are located in the inner flange 86. Attached to, or formed with, the steel tower 72 are tower mounts 66 that are connected to the guide rail supports 68. Attached to the guide rail support 68 that is shown in the lower portion of FIG. 5 is a ladder 80. A fall arrester 82 is attached to the ladder 80 to increase the safety with which a worker can traverse the ladder 80. As also shown in FIG. 5, the first and second slide pins 48a, 48b are engaged with the pin receiving holes 70 in the guide rails 40.

The upper portion of the platform assembly 10, as shown in FIG. 5, is constructed using the first and second carriage tracks 20a, 20b that are each supported by the first and second lower support beams 18a, 18b, respectively. The first and second carriage tracks 20a, 20b and the first and second lower support beams 18a, 18b are connected using a first cross beam 26 and a second cross beam 28. While in the preferred embodiment the first and second carriage tracks 20a, 20b are connected using only two cross beams, as mentioned above, it is understood by those of skill in the art that the present invention is not limited to the manner in which the upper portion of the platform assembly 10 is formed. For instance, the upper portion of the platform may be formed using first and second carriage tracks 20a, 20b that are connected by more than two, e.g. four, cross beams. Depending on the height, weight, or type of machinery that is to be lifted and depending on the type of structure to be climbed, it could be preferable to have a solid platform, that does not have a hole 30 therein, or it could be preferable to have an upper portion of the platform that does not extend beyond the guide rails. Using a platform assembly that has first and second carriage tracks 20a, 20b that do not extend beyond the guide rails 40 would be useful when using the platform assembly with office buildings and apartment buildings. This would allow for the easy transportation of large or heavy objects to various levels of the office building or the apartment building.

The first and second carriage tracks 20a, 20b and the first and second cross beams 26, 28 define an A-shaped structure wherein the opening 30 is in the upper portion of the platform assembly 10. In addition, the first and second carriage tracks 20a, 20b extend beyond the guide rails 40 to flank both sides of the steel tower 72. The extension of the first and second carriage tracks 20a, 20b along both sides of the steel tower 72 is shown, in a side elevational view, in FIG. 1 and, in a top plan view, in FIG. 5.

Referring to FIG. 2, a load can be supported on an adjustable carriage assembly 90 that moves along the carriage tracks 20a, 20b via guided continuous roller bearings 92. In addition, first and second transverse hydraulic cylinders 182a, 182b are used to laterally control the motion of the adjustable carriage assembly 90 on top of the carriage tracks 20a, 20b.

Figure 6:
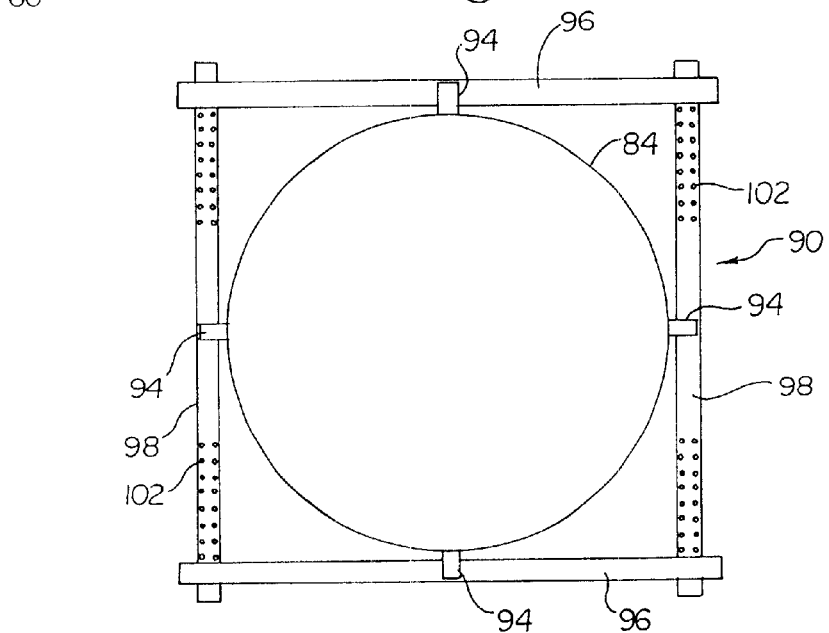
FIG. 6 is a top plan view of the largest tower segment being supported by an adjustable carriage assembly.

Referring to FIG. 6, a tower segment 84 is supported by an adjustable carriage assembly 90 that is slidably guided along the first and second carriage tracks 20a, 20b (shown in FIG. 5). The tower segment 84 has four bolt-on brackets 94 that are attached around the circumference of the tower segment 84. The bolt-on brackets 94 vertically support the tower segment 84 on top of the adjustable carriage assembly 90. The bolt-on brackets 94 each have a bearing surface 94a that engages the adjustable carriage assembly 90.

Figure 7:
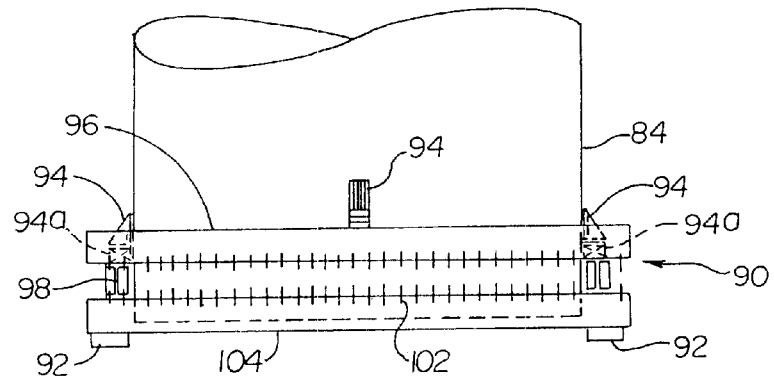
FIG. 7 is a side elevational view of the tower segment of FIG. 6 supported by the adjustable carriage assembly of FIG. 6.

The tower segment 84 shown in FIG. 6 has the largest diameter that can be accommodated by the adjustable carriage assembly 90. As also shown in FIG. 7, the carriage assembly 90 is constructed using lateral carriage beams 96 that support bolt-on brackets 94 on opposite sides of the tower segment 84. The lateral carriage beams 96 are bolted into bolt holes 102 that are located in the carriage cross beams 98. Both the lateral carriage beams 96 and the carriage cross beams 98 are adjustable to allow the carriage assembly 90 to support tower segments 84 having various diameters.

As shown in FIG. 7, two of the four bolt on brackets 94 are supported by the carriage cross beams 98 and the remaining bolt-on brackets 94 are supported by the lateral carriage beams 96. As shown in phantom, the bottom end of the tower segment 84 extends below the upper surface of the platform engaging carriage beams 104. The platform engaging carriage beams 104 move along the first and second carriage tracks 20a, 20b using guided continuous roller bearings 92. The guided continuous roller bearings 92 each engage, via rollers (not shown), the side of the first or second carriage tracks 20a, 20b that faces upwardly. In addition, the guided continuous roller bearings 92 also have rollers (not shown) that engage the bottom and/or side surface of the first and second carriage tracks 20a, 20b to grip the first and second carriage tracks 20a, 20b. Thus, the guided continuous roller bearings 92 both prevent the adjustable carriage assembly 90 from disengaging from the first and second carriage tracks 20a, 20b and maintain the adjustable carriage assembly 90 in proper alignment over the first and second carriage tracks 20a, 20b.

Referring now to FIG. 2, as detailed above, the platform engaging carriage beams 104 are not adjustable and are held in a constant position, that is aligned over the carriage tracks 20a, 20b, by the guided continuous roller bearings 92. The carriage assembly 90 is transversely secured by the first and second transverse cylinders 182a, 182b (only one is shown) which also control the horizontal position of the carriage assembly 90, as described in more detail below. The transverse cylinders 182a, 182b also prevent the carriage assembly 90 from being displaced laterally along the first and second carriage tracks 20a, 20b of the platform assembly 10.

The first and second transverse cylinders 182a, 182b are each attached to the platform assembly 10 via a transverse brace 110 in the form of a pillow block. Each transverse brace 110 is mounted at the end of its respective carriage track 20a, 20b distal from the tower 72. The hydraulic cylinders 182a, 182b are attached to the transverse brace 110 by a pin connection 110a. The hydraulic cylinders 182a, 182b each include an extendable transverse rod 184a, 184b which is connected to its respective adjustable carriage beam 104 of the carriage assembly 90 using a sliding block 106. That is, the first transverse rod 184a is attached via the sliding block 106 to one platform engaging carriage beam 104 and the second transverse rod 184b is attached to the other, oppositely positioned, platform engaging carriage beam 104 via another sliding block 106. Each sliding block 106 is pinned to the end of one of the first and second transverse rods 184a, 184b and to one of the platform engaging carriage beams 104. The carriage beams 104 have a plurality of sliding block receiving holes 108 spaced at predetermined intervals along the length of the carriage beam 104, for reasons described hereinafter.

Referring now to FIGS. 1 and 2, the stroke of each transverse rod 184a, 184b is approximately 4 feet. As such, to move the carriage assembly 90 the approximate 10 feet between the center line 85 of the tower segment 84 and the center line 73 of the steel tower 72 requires that successive operations using the hydraulic cylinders 182a, 182b take place, as described in more detail below. The center line of tower 72 and lift platform 10 is designated as center line 76. While in the preferred embodiment the transverse rods 184a, 184b have a stroke of 4 feet, it is understood by those of ordinary skill from this disclosure that the hydraulic cylinders may be constructed using hydraulic rods having a larger stroke distance. For instance, transverse cylinders having a stroke distance of 15 feet can be used with the platform assembly 10. In addition, non-hydraulic mechanisms may be used which are well known in the art such as a rack and pinion system. When transverse cylinders 182a, 182b that are used have a greater stroke distance than the distance between the centerline 85 of the additional tower segment 84 and the centerline 73 of the steel tower 72, the carriage assembly 90 can be properly positioned over the steel tower 72 using only one extension of the transverse rods 184a, 184b. The changes to the preferred embodiment necessary to incorporate larger hydraulic cylinders, such as those having stroke distances in excess of 15 feet, are well known to those of ordinary skill in the art in light of this disclosure.

The incremental movement of the adjustable carriage assembly 90 will be described with reference to FIG. 2. The preferred method of incrementally moving the adjustable carriage assembly 90, and an associated load, along the first and second carriage tracks 20a, 20b towards the steel tower 72 is to use the sliding blocks 106 in combination with multiple extensions of the transverse rods 184a, 184b. First, each carriage beam 104 is attached to a sliding block 106 at the sliding block receiving hole 108 closest to the steel tower 72. The transverse rods 184a, 184b are extended causing the adjustable carriage assembly 90 to move approximately 4 feet to the right, as viewed in FIG. 2.

Then, workers remove the pin from one of the sliding blocks 106 from a carriage beam 104, retract the associated transverse rod 184a or 184b into the associated hydraulic cylinder 182a or 182b, and re-pin the sliding block 106 to a sliding block receiving hole 108 that is next closest to the associated hydraulic cylinder 184a or 184b. Afterwards, the above procedure is repeated for the sliding block 106 that has not been adjusted. It is preferable to only detach one sliding block at a time to maintain stability of the carriage assembly 90, and its associated load, on the first and second carriage tracks 20a, 20b. Once both of the sliding blocks 106 have been re-positioned, the transverse rods 184a, 184b are again extended causing the adjustable carriage assembly 90 to move another 4 feet to the right. This process is repeated until the adjustable carriage assembly is properly aligned over the steel tower 72.

It is understood by those of ordinary skill in the art that other methods could be used to move the tower segment 84, along with the carriage assembly 90, over the top of the steel tower 72 without departing from the spirit and scope of the present invention. For instance, an alternative method to incrementally moving the adjustable carriage assembly 90 along the first and second carriage tracks 20a, 20b is to successive re-bolt and re-position the hydraulic cylinders 182a, 182b along the length of the first and second carriage tracks 20a, 20b (not shown).

Figure 8:
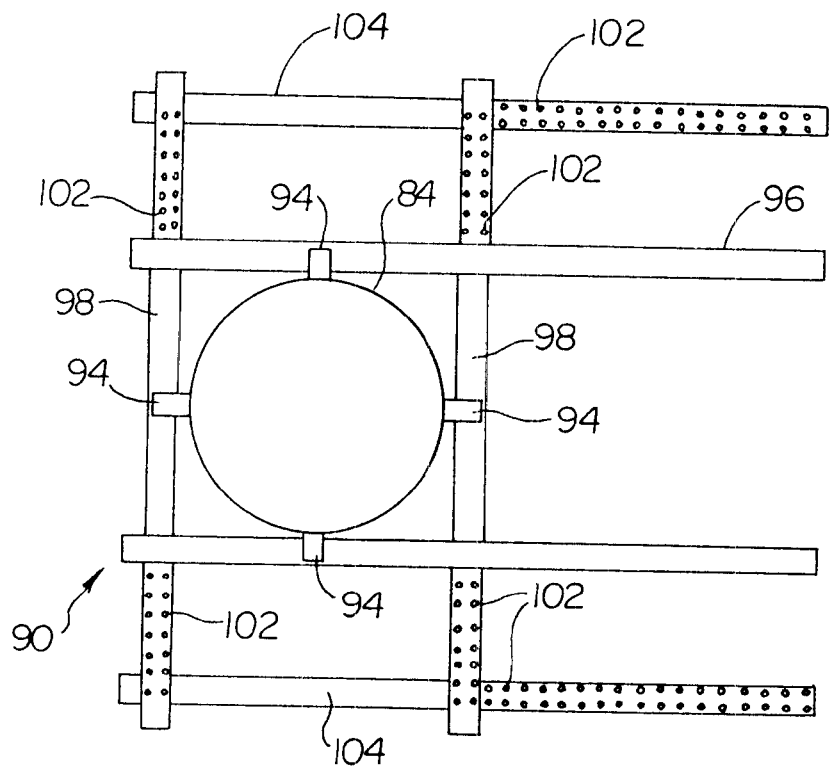
FIG. 8 is a top plan view of the smallest tower segment being supported by the adjustable carriage assembly of FIG. 6.
Figure 9:
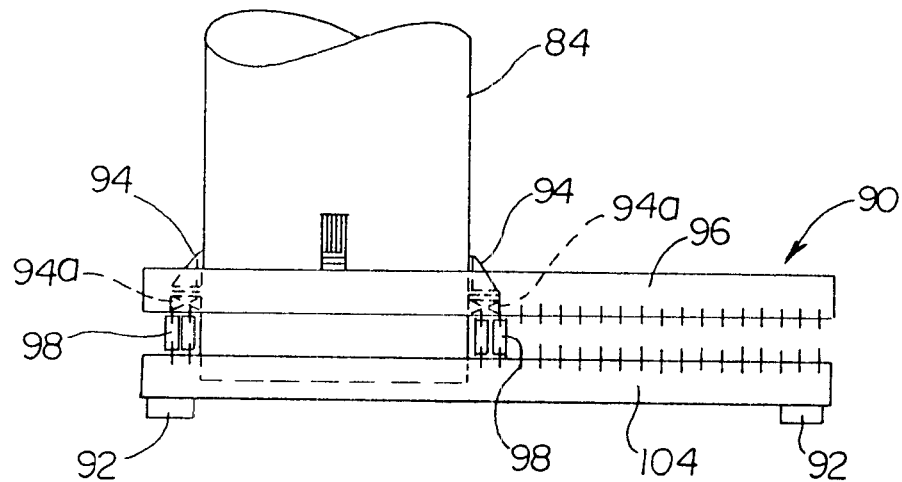
FIG. 9 is a side elevational view of the smallest tower segment being supported by the adjustable carriage assembly of FIG. 6.
Figure 10:
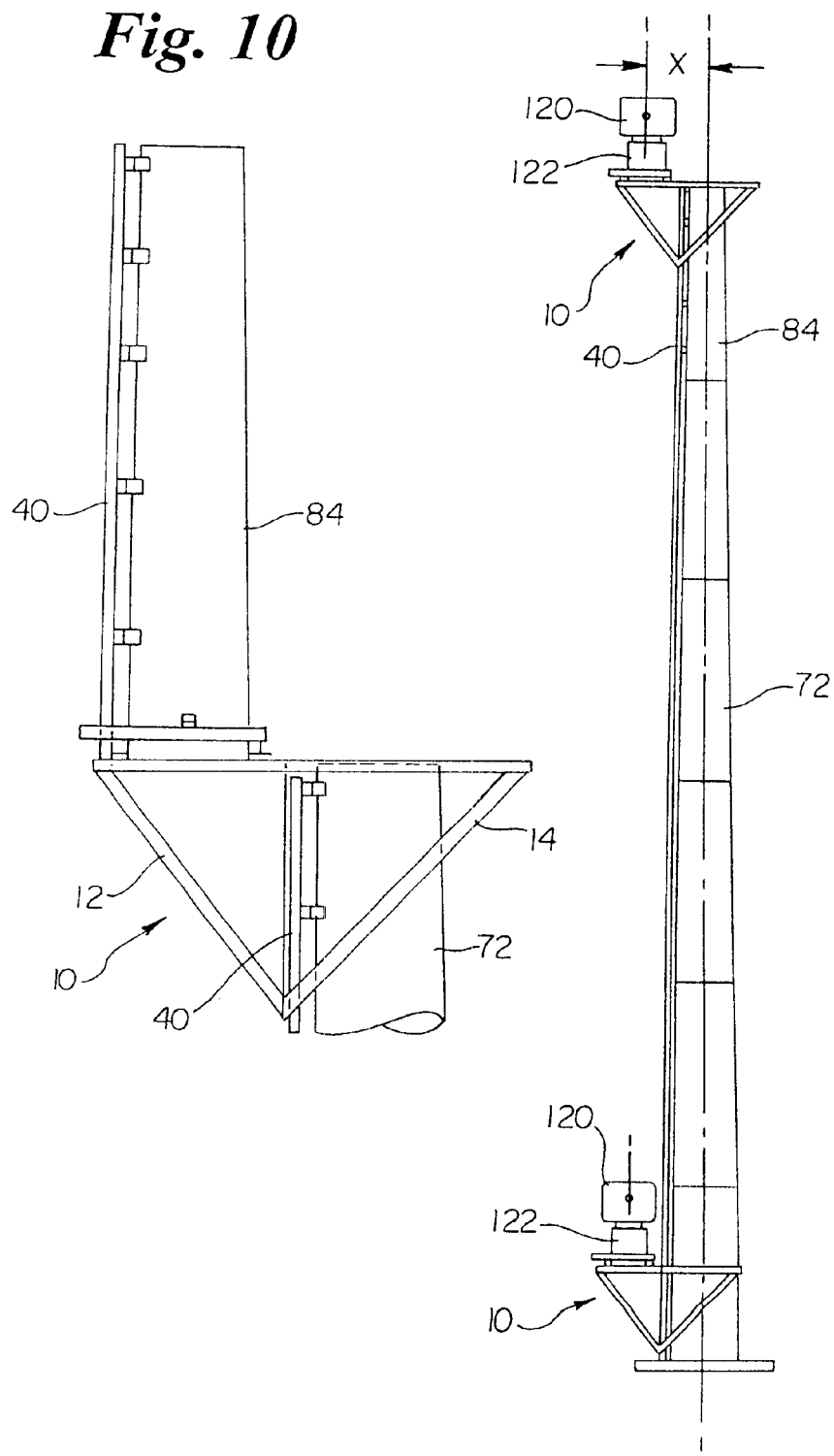
FIG. 10 is a side elevational view of a guide rail climbing lifting platform positioned to transfer an additional tower segment onto the end of a previously positioned tower segment.

Referring to FIGS. 8 and 9, the adjustable carriage assembly 90 is shown supporting the tower segment 84 having the smallest diameter. The platform engaging carriage beams 104 remain positioned to be appropriately aligned over the first and second carriage tracks 20a, 20b. However, both the carriage cross beams 98 and the lateral carriage beams 96 have been adjusted to account for the small diameter of the tower segment 84. As discussed above, the tower segment 84 has bolt on brackets 94 attached about its circumference to allow the lateral carriage beams 96 and the carriage cross beams 98 to vertically support the tower segment 84. The carriage cross beam 98 that is shown on the right side of both FIGS. 8 and 9 is bolted to bolt receiving holes 102 that are located towards the midpoint of the platform engaging carriage beams 104. Additionally, the lateral carriage beams 96 are bolted to bolt receiving holes 102 that are located closer to the center of the carriage cross beams 98. Thus, the adjustable carriage assembly 90 can accommodate tower segments 84 having various diameters. This facilitates the modular construction of towers, as the design of many towers calls for a narrowing peak, as shown in FIG. 1. The range of sizes that can be accommodated by the adjustable carriage assembly 90 can be altered depending on the applications for which the adjustable carriage assembly 90 is used.

Referring now to FIGS. 5, 7 and 9, the bottom surface 94a of the bolt-on brackets 94 (i.e. the surface of the bolt-on brackets 94 that contacts the adjustable carriage assembly 90) that are attached to the tower segment 84 have a bearing surface 94a that allows the tower segment 84 to be slightly rotated to align the bolt holes 74 in the inner flange 86 at the bottom of the additional tower segment 84 with the bolt holes at the top of the existing tower 72, as shown in FIG. 5. The use of bearing-type bolt-on brackets 94 allows the tower segment 84 to be rotated approximately 5–10 degrees to align the guide rails 40 of the tower segment 84 with the guide rails 40 of the steel tower 72.

Often, it is desirable to mount a permanent structure to the top of a tower. The preferred embodiment of the steel tower 72 shown in FIGS. 1–13 is a wind turbine tubular tower. As such, it is desirable to mount a wind turbine generator (not shown) to the top of the wind turbine tubular tower once the steel tower 72 is completed.

Figure 11:
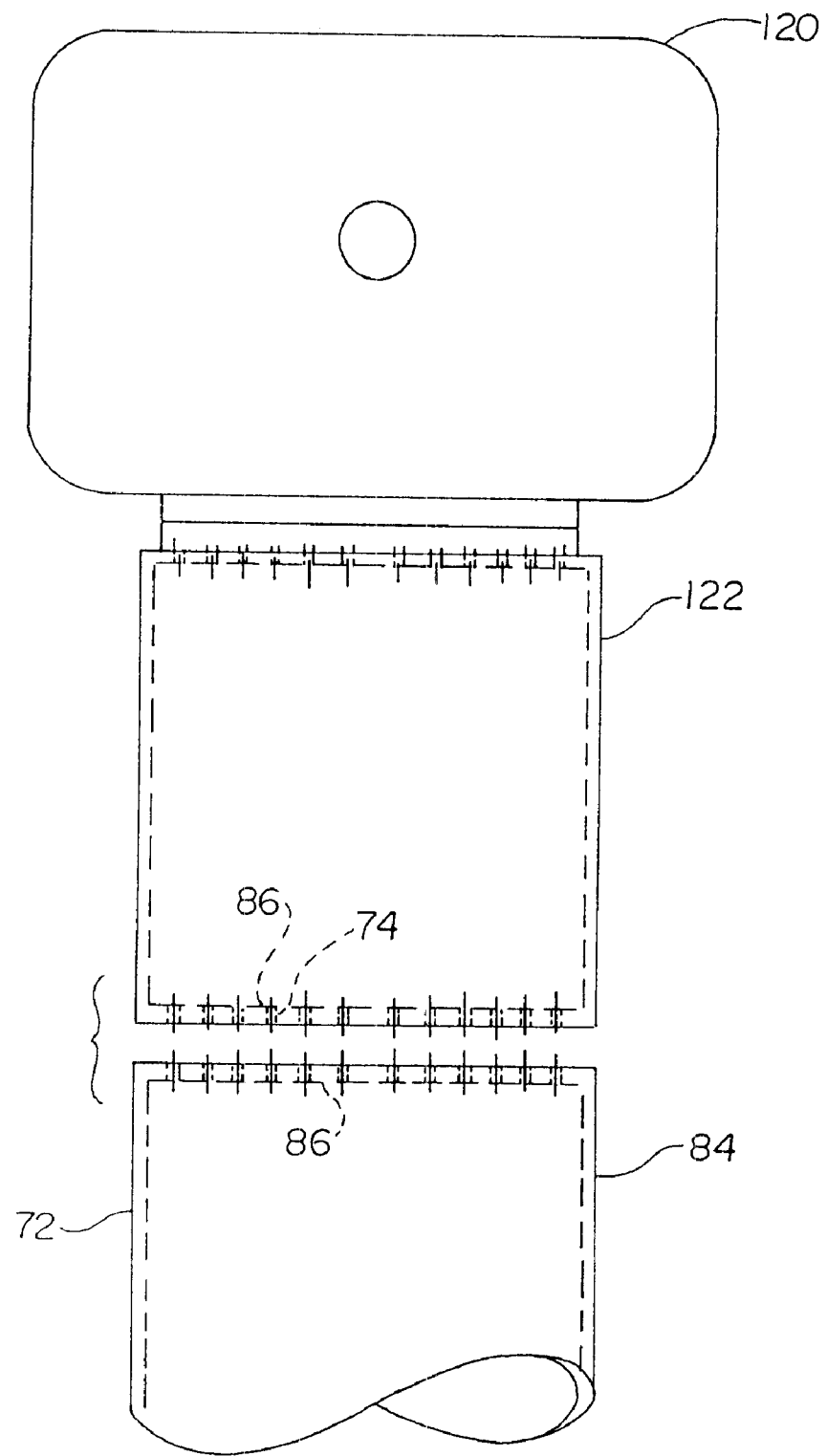
FIG. 11 illustrates the alignment of a nacelle, that encloses a wind turbine generator mounted on a short tower segment, with the top of a partially constructed tower.

Referring now to FIGS. 11–13 and 18–21, one method of attaching the wind turbine generator to the wind turbine tubular tower is to place a nacelle 120 over the wind turbine generator (not shown). Then, the wind turbine generator and the nacelle 120 are attached to a short tower segment 122. The nacelle 120 is an enclosure for the wind turbine generator that reduces the wind resistance experienced by the wind turbine generator. The wind turbine generator and the nacelle 120 are mounted to the short tower segment 122, as shown in FIG. 11, prior to lifting the wind turbine generator to the top of the steel tower 72 with the platform assembly 10. The short tower segment 122 may, for example, have a length of approximately 3 to 5 feet.

The nacelle (and the enclosed wind turbine generator) 120 are attached to the short tower segment 122 so that the nacelle 120 and the wind turbine generator can rotate 360 degrees on top of the short tower segment 122. This allows the nacelle 120 to be facing the side of the platform assembly 10 during the lifting operation, as shown in FIG. 12. This reduces the moment force that the platform assembly 10 is subject to during the lifting process.

Figure 13:
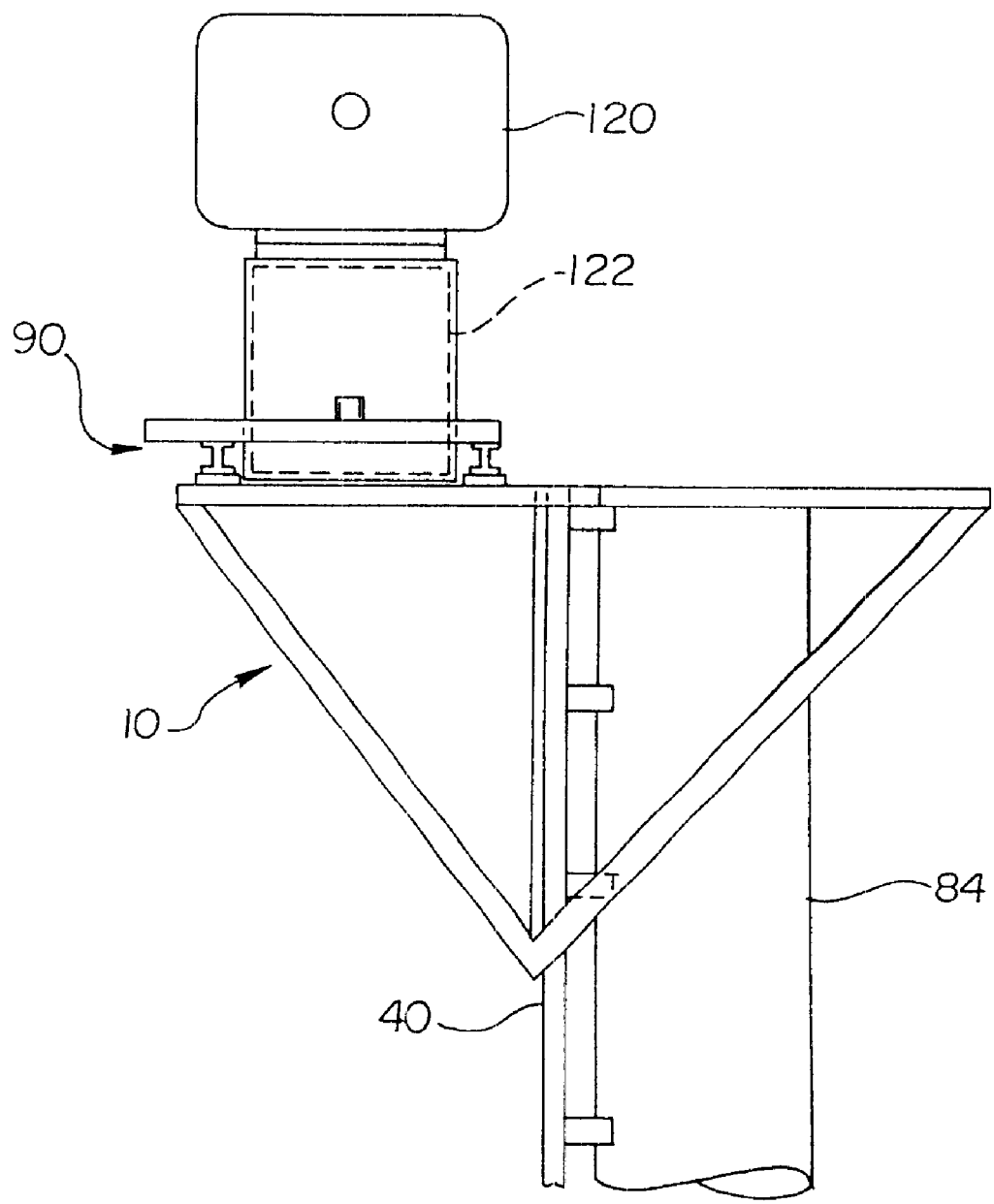
FIG. 13 is a side elevational view of the guide rail climbing lifting platform supporting the short tower segment on a carriage assembly at the top of the partially constructed tower.

Once the nacelle 120 and the short tower segment 122 are located at the top of the steel tower 72 (as shown in FIG. 13), it is necessary to align the bolt holes 74 in the inner flanges 86 of both the upper end of the tower 72 and the lower end of the short tower segment 122. FIG. 12 shows the platform assembly 10 supporting the short tower segment 122 and the attached nacelle 120, at both the base of the steel tower 72 and at the top of the steel tower 72. FIG. 13 illustrates, in phantom line, the protrusion of the short tower segment 122 below the adjustable carriage assembly 90.

Figure 19:
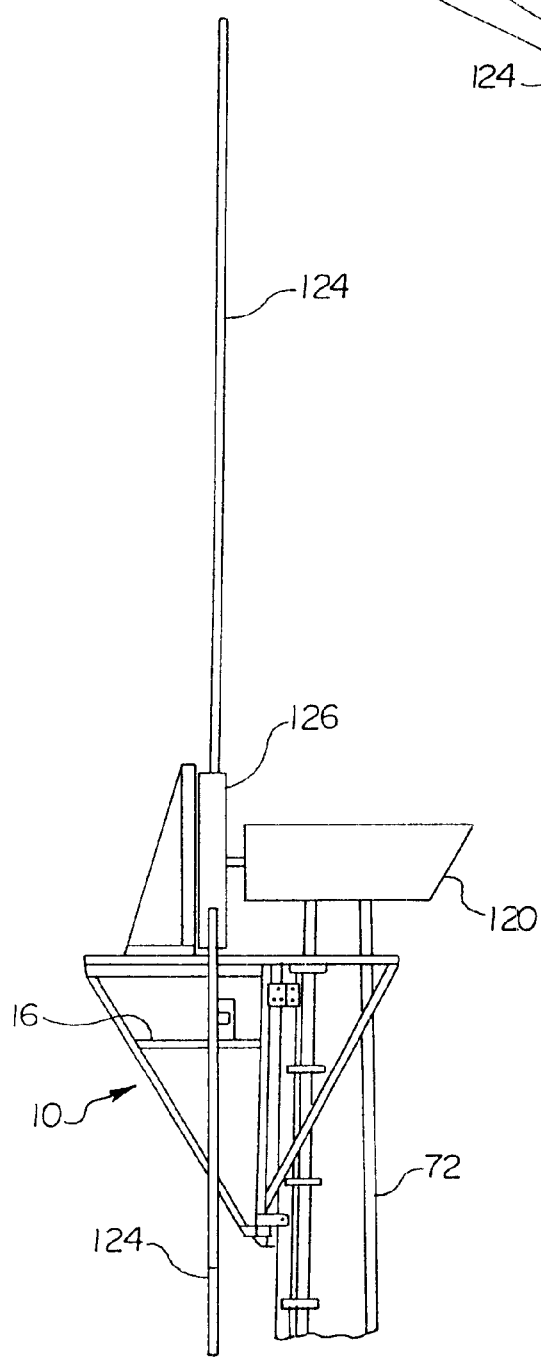
FIG. 19 is a side elevational view of the guide rail climbing lifting platform of FIG. 1, shown in position to place the rotor blade assembly onto a wind turbine generator.
Figure 21:
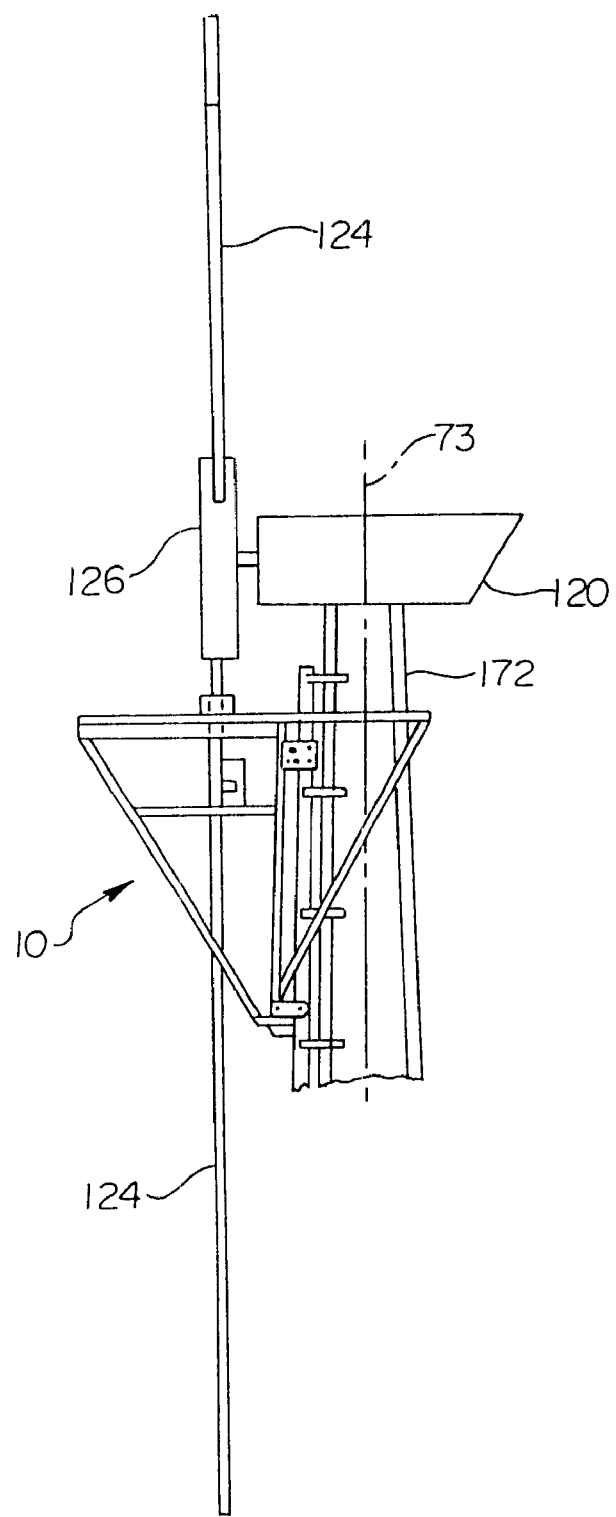
FIG. 21 is a side elevational view of the guide rail climbing lifting platform of FIG. 1, secured to the rotor blade projecting downwards from the rotor.

When loading either a tower segment 84, a short tower segment 122, or a wind turbine generator onto a partially constructed steel tower 72, it is first necessary to bring the platform apparatus to the top of the steel tower 72, as shown in FIGS. 1, 10, 12, and 13. Afterwards, as shown in FIG. 2, the transverse cylinders 182a, 182b are used to extend the transverse rods 184a, 184b to move the carriage assembly 90 over the center line 73 of the steel tower 72, as discussed above. Once the tower segment 84, the short tower segment 122, or the nacelle 120 is aligned over the center line 73 of the steel tower 72, the bolt-on bearing brackets 94 are used to rotate the additional tower component into the appropriate alignment with the uppermost tower segment 84 of the steel tower 72, as shown in FIGS. 19 and 21. This is necessary to both properly align the guide rails 40 and the bolt holes 74. The additional tower component (e.g. any one of a tower segment 84, a short tower segment 122, a nacelle 120 and any other machinery supported by the platform assembly) is engaged with the upper end of the steel tower 72 by lowering the platform assembly 10 until the bottom end of the additional tower component engages the top end of the steel tower 72.

Once the additional tower component is engaged with the top end of the steel tower 72, the additional component is bolted to the end of the steel tower 72 by workers that are positioned inside of the steel tower 72. To facilitate the movement of workers inside of the steel tower 72 an internal stairwell (not shown) can be formed inside of each tower segment 84 to allow a worker to climb up inside of the steel tower 72.

Once the nacelle 120, and the enclosed wind turbine generator, are mounted on the top of the steel tower 72, the nacelle 120 and the wind turbine generator are rotated so that the front of the nacelle 120 (i.e. the side onto which the rotor 126 and rotor blades 124 are attached) faces the front of the platform assembly 10, as shown in FIGS. 19 and 21.

Figure 18:
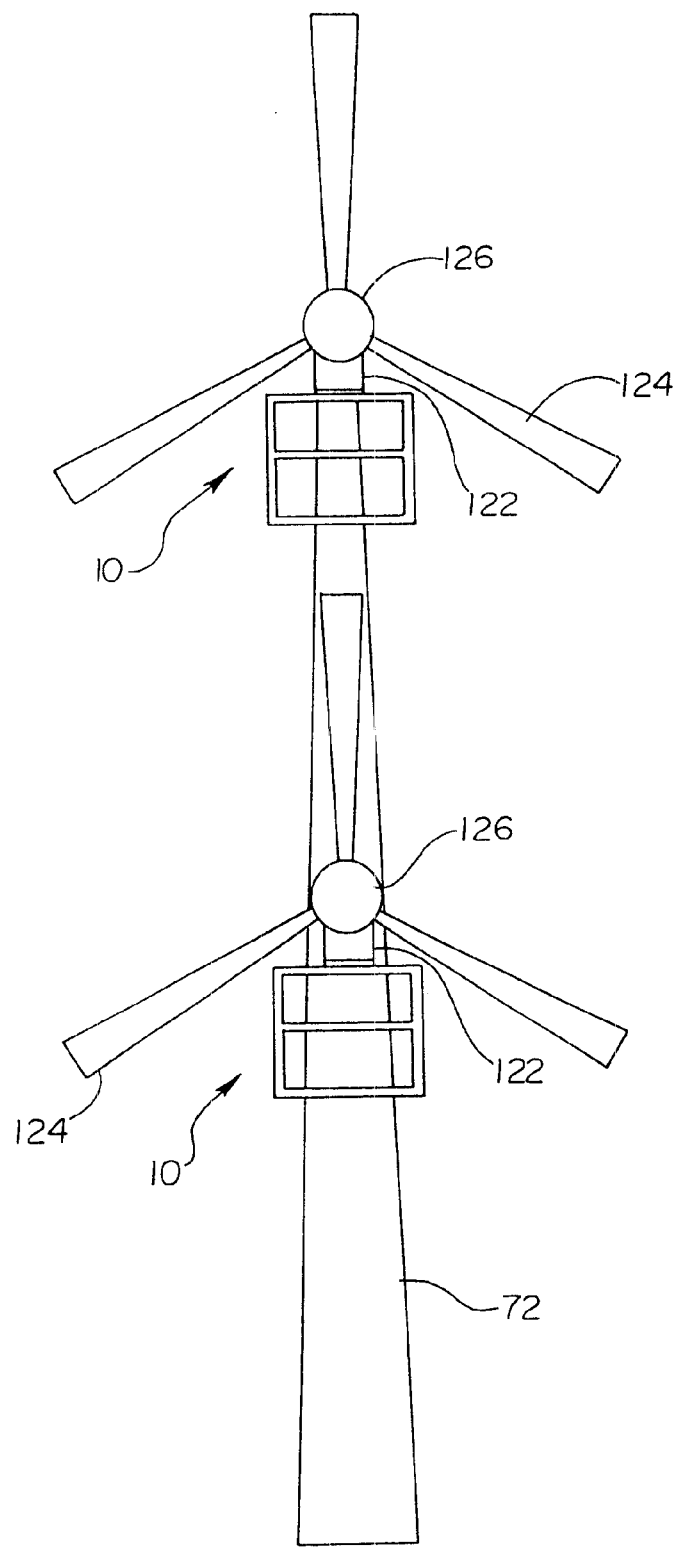
FIG. 18 is a front elevational view of the guide rail climbing lifting platform of FIG. 1, shown in two positions, transporting a rotor blade assembly to the top of the tower.

After the nacelle 120 has been rotated 90 degrees, the platform assembly is used to lift the rotor 126, and the attached rotor blades 124 to the top of the steel tower as shown in FIG. 18. Once the rotor 126 and the rotor blades 124 are aligned properly with the nacelle 120, the rotor assembly is attached to the wind turbine generator as shown in FIG. 19.

Referring now to FIGS. 14–17, a hydraulic circuit illustrates the control of the first and second latch pins 46, the first and second slide pins 48a, 48b, the first and second lift cylinders 42a, 42b, and the first and second transverse cylinders 182a, 182b. A diesel powered pumping unit 50, also shown on the equipment deck 16 in FIG. 3, drives a variable displacement piston pump 152. In the preferred embodiment, the diesel power pumping unit is a three cylinder air cooled pumping unit that is rated at 29 horsepower at 1800 rpm and the variable displacement piston pump 152 is pressure and flow compensated with a horse power limiter. The variable displacement piston pump 152 pumps fluid from a hundred gallon reservoir 160 past a third check valve 174c to a pressure filter 156. Afterwards the fluid flows into a simplified load sense sectional valve, generally designated 132. The simplified load sense sectional valve 132 contains five hydraulic switches that control the various hydraulic cylinders. Additionally, fluid is returned from the simplified load sense sectional valve 132 to the reservoir 160 after passing through the return filter 158. Preferably both the return filter 158 and the pressure filter 156 are ten micron filters. In addition, a system pressure relief valve 154 is also capable of passing fluid through the return filter 158 to the reservoir 160.

The hydraulic switches inside the simplified load sense sectional valve 132 are standard spool valves which allow fluid to be pumped along different paths to the various hydraulic cylinders. All of the hydraulic switches can be positioned to use either a first flow path 144 or a second flow path 146. Additionally, the hydraulic switches controlling the first and second lift cylinders 42a, 42b and hydraulic switches controlling the first and second transverse cylinders 182a, 182b can also be positioned to use a third flow path 148. The details of the individual hydraulic switches will be discussed along with the corresponding hydraulic components below.

The first and second latch pins 46a, 46b are controlled by the latch pin hydraulic switch 140. The latch pin hydraulic switch 140 is capable of switching between positions using a first flow path 144 and a second flow path 146. In addition, the latch pin hydraulic switch 140 is biased by a fourth hydraulic switch biasing element 150d, such as a spring, into a position using the second flow path 146. In the preferred embodiment, the first and second latch pin cylinders 162a, 162b have a 2 inch bore, a 1.375 inch diameter rod, and an 8 inch stroke.

When the latch pin hydraulic switch 140 is in a position that uses the second flow path 146, fluid is pumped into the first and second latch pin cylinders 162a, 162b to force the first and second latch pins 46a, 46b to extend outward (thus, engaging the guide rail and vertically stabilizing the platform assembly 10).

When the latch pin hydraulic switch 140 is positioned to use the first flow path 144, fluid is pumped into the first and second latch pin cylinders 162a, 162b to force the first and second latch pins 46a, 46b to retract into the first and second latch pin cylinders 162a, 162b (thus disengaging the latch pins 46a, 46b from the guide rails 40). The latch pin hydraulic switch 140 is moved to the first flow path 144 by a solenoid 140a which is remotely controlled by an operator located at the operating panel described below.

The biasing of the latch pin hydraulic switch 140 into a position using the second flow path 146 is a safety feature that causes the latch pins 46a, 46b to have, as a default position, the extended position. In addition, a second safety is designed into the system by using a first and a second latch pin biasing element 164a, 164b to bias the first and second latch pins 46a, 46b into an extended position in the event of a loss of fluid. Thus, to retract the first and second latch pins 46a, 46b it is necessary to both have proper fluid flow and to override the bias of the latch pin hydraulic switch 140.

The slide pin hydraulic switch 138 controls the first and second slide pins 48a, 48b. The slide pin hydraulic switch 138 is movable between a position using a first flow path 144 and a position using a second flow path 146. The slide pin hydraulic switch 138 is biased into a position using the second flow path 146 by a third hydraulic switch biasing element 150c. In the preferred embodiment, the first and second slide pin cylinders 166a, 166b have a 2 inch bore, a 1.375 inch diameter rod, and an 8 inch stroke.

When the slide pin hydraulic switch 138 is in a position using the second flow path 146, fluid is pumped to the first and second slide pin cylinders 166a, 166b to extend the first and second slide pins 48a, 48b outward from the first and second slide pin cylinders 166a, 166b. When the slide pin hydraulic switch 138 is in a position using the first flow path 144, fluid is pumped to the first and second slide pin cylinders 166a, 166b to retract the first and second slide pins 48a, 48b into the first and second slide pin cylinders 166a, 166b. The slide pin hydraulic switch 138 is moved to the first flow path 144 by a solenoid 138a which is remotely controlled by an operator located at the operating panel described below.

As a safety feature, the slide pin hydraulic switch 138 is biased by the third hydraulic switch biasing element 150c, such as a spring, into a position using the second flow path 146. This causes the first and second slide pins 48a, 48b to, by default, extend from the first and second slide pin cylinders 166a, 166b and engage the guide rails 40. An additional safety is built into the first and second slide pins 48a, 48b by inserting a first and a second slide pin biasing element 168a, 168b into the first and second slide pin cylinders 166a, 166b. The first and second slide pin biasing elements 168a, 168b bias the first and second slide pins 48a, 48b into the extended position in the event of a lack of fluid flow. Thus, the first and second slide pins 48a, 48b are only retracted into the first and second slide pins cylinders 166a, 166b when there is proper fluid flow in the conduits and the slide pin hydraulic switch 138 is moved out of its biased position.

Additionally, in the preferred embodiment of the guide rail climbing lifting platform additional safe guards are built into the operating panel that controls the hydraulic cylinders of the platform assembly 10. The hydraulic cylinders are controlled from an operating panel that is located close to the ground level proximate to the base of the steel tower 72. From a remote point on the ground, or from a position in the tower, a controller operates the operating panel (not shown) to manipulate the hydraulic switches and control the hydraulic cylinders of the platform assembly 10. The operating panel includes appropriate electronic lock outs well understood by those of ordinary skill in the art that will not allow the operator to disengage the first and second latch pins 46a, 46b when the first and second slides pins 48a, 48b are not engaged with the guide rails 40. Similarly, the operating panel will not allow an operator to disengage the first and second slide pins 48a, 48b when the first and second latch pins 46a, 46b are disengaged from the guide rails 40.

While in the preferred embodiment people are not transported on the platform assembly 10 as it traverses the steel tower 72 and the platform assembly 10 is controlled by an operator positioned on the ground, it is understood by those of skill in the art that the present invention is not limited to a lifting platform that does not transport people. For instance, with the addition of further safeguards (that are well known to those of skill in the art), it is possible to have workers and operators transported by the platform while controlling the platform operations. The advantage of not transporting people on the platform assembly 10 is that the cost of manufacturing the platform assembly 10 is significantly reduced due to not having to design the guide rail climbing lifting platform 10 to comply with OSHA (Occupational Safety and Health Act) regulations.

The first and second lift cylinder hydraulic switches 134, 136 are used to control the first and second lift rods 43a, 43b. Two hydraulic switches are used to control the first and second lift cylinders 42a, 42b to increase the fluid flow provided to the first and second lift cylinders 42a, 42b. The first and second lift cylinder hydraulic switches 134, 136 are adjustable into a position using either of a first flow path 144, a second flow path 146, and a third flow path 148. Both the first and second lift cylinder hydraulic switches 134, 136 are biased into a position using the third flow path. The first lift cylinder hydraulic switch 134 is biased into position by a first and a sixth hydraulic switch biasing element 150a, 150f, such as a spring, and the second lift cylinder hydraulic switch 136 is biased into position by a second and a seventh hydraulic switch biasing element 150b, 150g, such as a spring. In the preferred embodiment, the first and second lift cylinders 42a, 42b are double acting and have a 6 inch bore, a 3 inch diameter rod, and a stroke of 10 feet.

The pressure equalizing connection 176 synchronizes the movement of the first and second lift rods 43a, 43b. The control orifice used as the pressure equalizing connection 176 is preferably 0.040 inches. The control orifice used at the pressure equalizing connection 176 remains small so that, in the event of conduit breakage, fluid will not escape faster through the pressure equalizing connection 176 than the variable displacement piston pump 152 can pump replacement fluid into the first and second lift cylinders 42a, 42b.

When the first and second lift cylinder hydraulic switches 134, 136 are in position to use the first flow path 144, fluid is pumped so as to retract the first and second lift rods 43a, 43b into the first and second lift cylinders 42a, 42b. When the first and second lift cylinder hydraulic switches 134, 136 are in position to use the second flow path 146, fluid is pumped so as to extend the first and second lift rods 43a, 43b from the first and second lift cylinders 42a, 42b. When the first and second lift cylinder hydraulic switches are in position to use the third flow path 148, the fluid in the conduits is vented to the reservoir 160. This results in both the first and second lift rods 43a, 43b staying in their current position. The first and second lift cylinder hydraulic switches 134, 136 are each moved between the first, second and third flow paths 144, 146, 148 by solenoids 134a, 136a, respectively, which are remotely controlled by an operator located at the operating panel described above.

The first lift rod 43a remains in its current position when fluid in the conduits connecting the first lift cylinder 42a to the variable displacement piston pump 152 is vented back to the reservoir (i.e. when the first and second lift cylinder hydraulic switches 134, 136 are using the third flow path 148), because of the combination effect of the first counter balance valve 170a and the first check valve 174a. As viewed in FIG. 14, fluid in the upper portion of the first lifting cylinder 42a is prevented from leaving by the first check valve 174a and by the first counter balance valve 170a. The first check valve 174a only allows fluid to pass from the right side towards the left side of the first check valve 174a. The first counter balance valve 170a does not allow fluid to pass from the left of the first counter balance valve 170a to the right side of the first counter balance valve 170a. In the preferred embodiment the first through the sixth counter balance valves 170a–170f are designed to have a 4.5:1 ratio.

Figure 14:
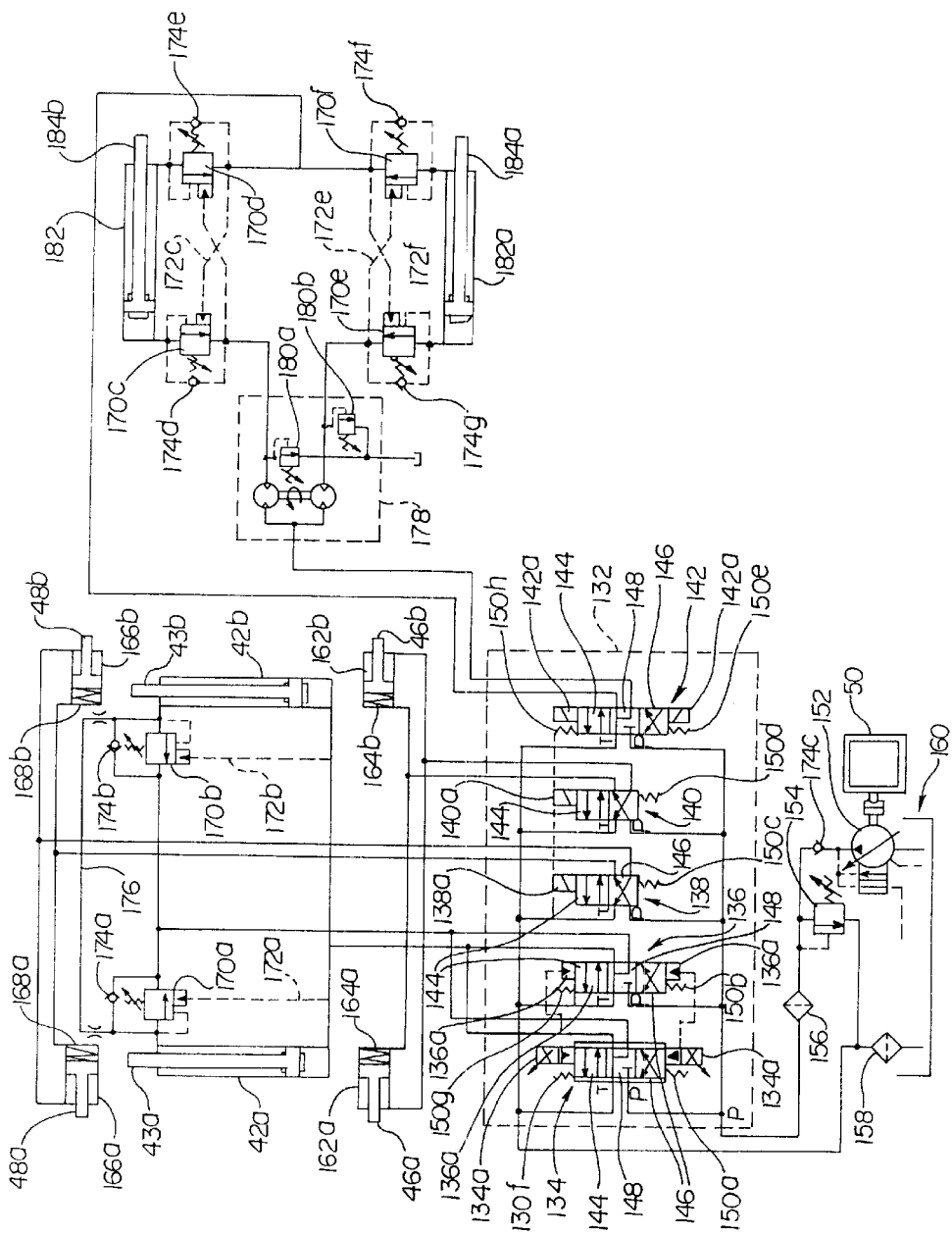
FIG. 14 is a hydraulic circuit illustrating the various components used to control the operation of the guide rail climbing lifting platform.
Figure 15:
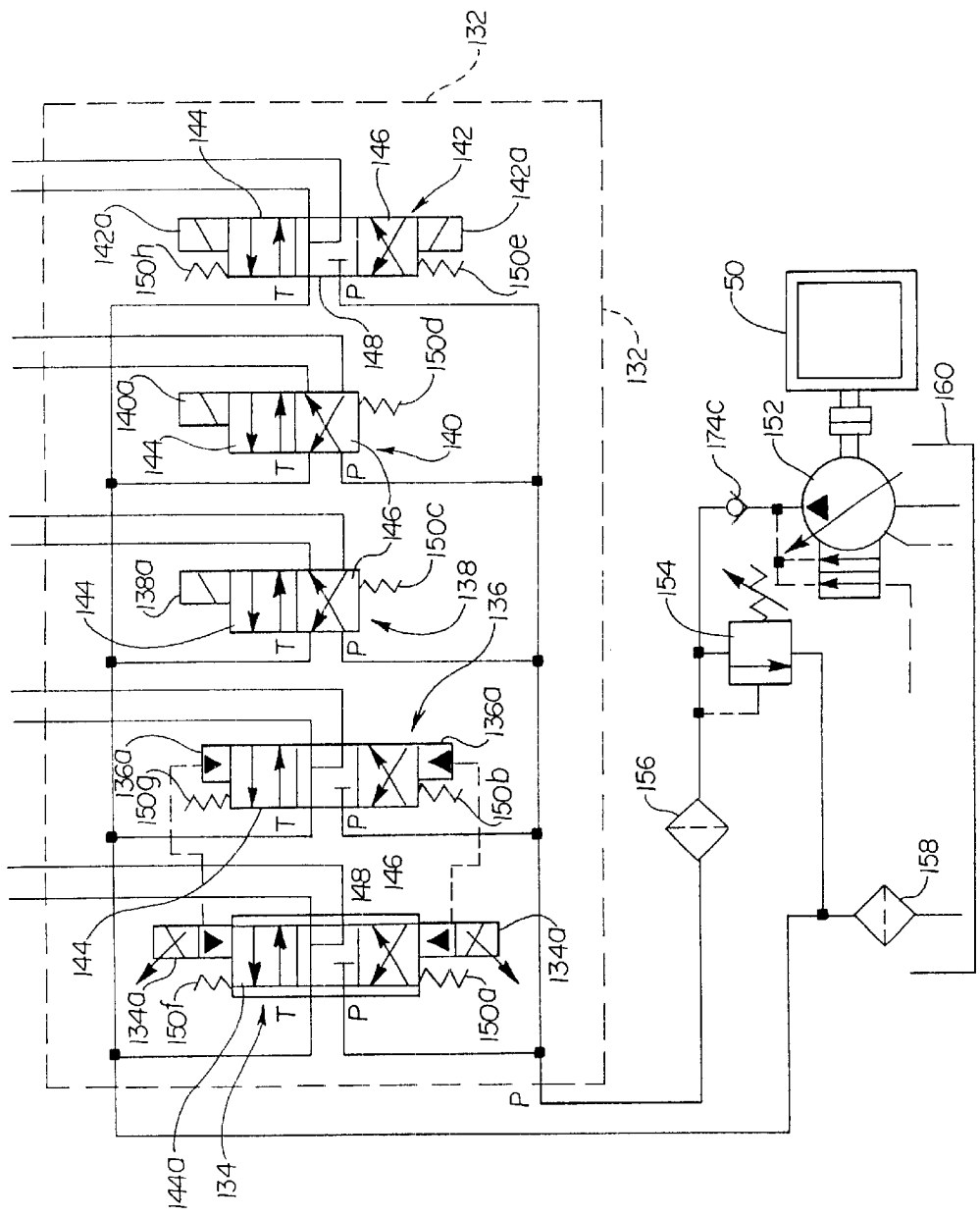
FIG. 15 is a partial enlarged view of the hydraulic circuit of FIG. 14.
Figure 16:
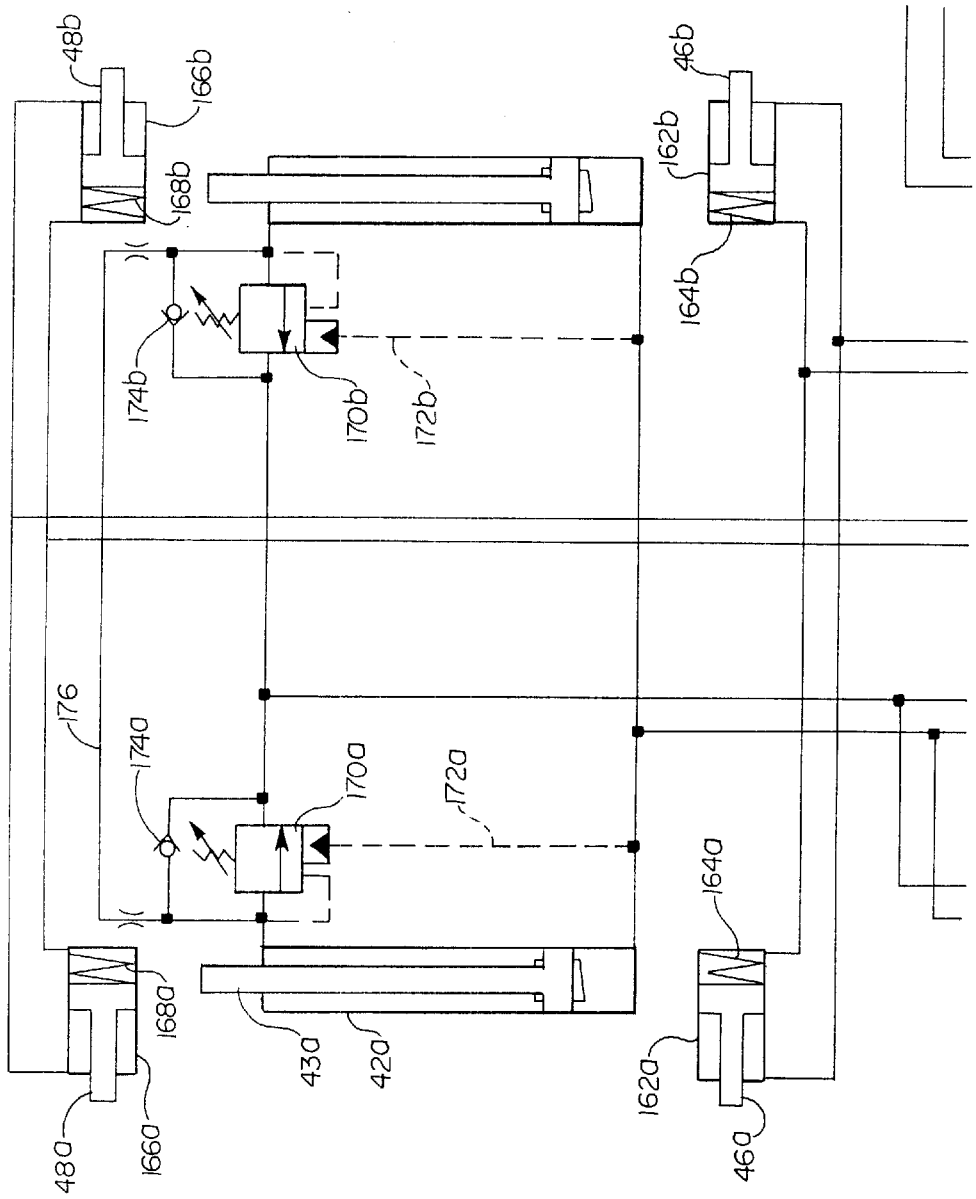
FIG. 16 is a partial enlarged view of the hydraulic circuit of FIG. 14.

A first pilot line 172a connects the conduit attached to the lower end of the first lifting cylinder 42a, as viewed in FIG. 14, to the first counter balance valve 170a. The first pilot line 172a causes the first counter balance valve 170a to release fluid when the load induced pressure exceeds a predetermined amount.

Additionally, the pressure equalizing connection 176 does not allow fluid to leave the first lifting cylinder 42a and return to the reservoir 160. The pressure equalizing connection 176 retains fluid because the fluid in the pressure equalizing connection 176 is blocked on each side by the combination of both a counter balance valve 170a, 170b and a check valve 174a, 174b.

The operation of the second lift cylinder 42b when the first and second lift cylinder hydraulic switches 134, 136 are positioned to use the third flow path 148 is the same as that described above for the first lift cylinder 42a. Moreover, the second counter balance valve 170b, the second check valve 174b, and the second pilot line 172b, serve the same function for the second lift cylinder 42b that their counterparts serve for the first lift cylinder 42a.

The transverse hydraulic cylinder switch 142 controls the operation of the first and second transverse cylinders 182a, 182b. The transverse hydraulic cylinder switch 142 is adjustable into a position using either of a first flow path 144, a second flow path 146, and a third flow path 148. The transverse hydraulic cylinder switch 142 is biased into a position using the third flow path 148. The transverse hydraulic cylinder switch 142 is biased into position by a fifth and an eighth hydraulic switch biasing element 150e, 150h, such as a spring. In the preferred embodiment, the first and second transverse cylinders 182a, 182b have a 4 inch bore, a 2.5 inch diameter rod, and a stroke of 4 feet.

Figure 17:
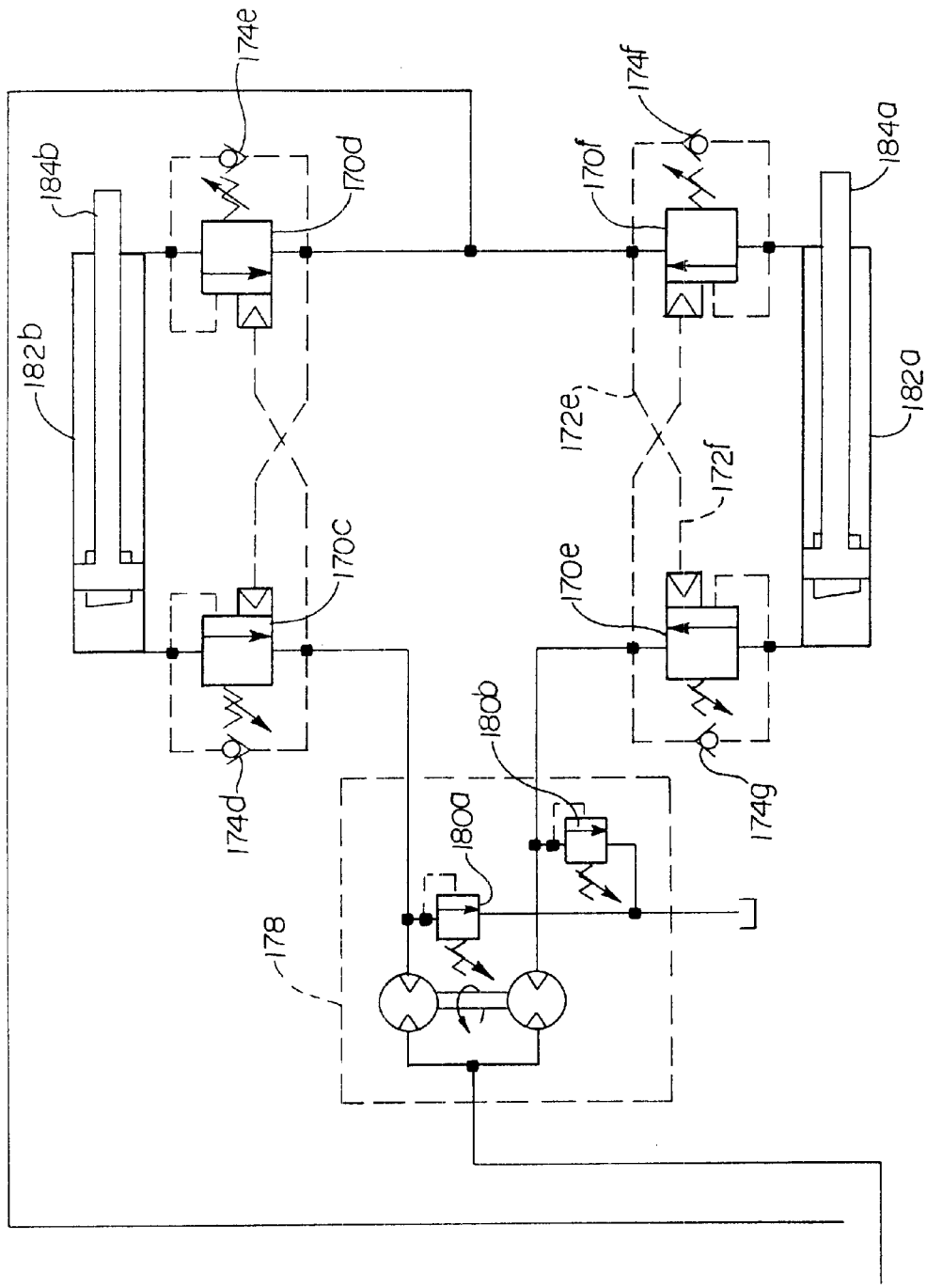
FIG. 17 is a partial enlarged view of the hydraulic circuit of FIG. 14.

When the transverse hydraulic cylinder switch 142 is in a position that uses the first flow path 144, fluid is pumped into the first and second transverse cylinders 182a, 182b to extend the first and second transverse rods 184a, 184b from the first and second transverse cylinders 182a, 182b. In addition, the fluid pumped to the left sides of the first and second transverse cylinders 182a, 182b, as viewed in FIGS. 14 and 17, is passed through a rotary flow divider 178 that preferably uses a 50:50 split. A first and second relief valve 180a, 180b are positioned inside of the rotary flow divider 178. When the transverse hydraulic cylinder switch 142 is in a position using the second flow path 146, fluid is pumped to the first and second transverse cylinders 182a, 182b to retract the first and second transverse rods 184a, 184b into the first and second transverse cylinders 182a, 182b. When the transverse hydraulic cylinder switch 142 is in a position using the third flow path 148, fluid that is in the conduits between the variable displacement piston pump 152 and the first and second transverse cylinders 182a, 182b is vented to the reservoir 160. This results in both the first and second transverse rods 184a, 184b staying in their current position. The position of the tranverse hydraulic cylinder switch 142 is controlled by a double acting solenoid 142a which is remotely controlled by an operator located at the operating panel described above.

The first transverse cylinder 182a remains in its current position when fluid in the conduits connecting the first transverse cylinder 182a to the variable displacement piston pump 152 is vented back to the reservoir (i.e. when transverse hydraulic cylinder switch 142 is using the third flow path 148), because of the combination effect of the fifth and the sixth counter balance valves 170e, 170f, with the sixth and the seventh check valves 174f, 174g. Thus, a combination check valve and counterbalance valve on each end of the first transverse cylinder 182a prevents fluid from leaving the first transverse cylinder 182a.

As viewed in FIG. 14, fluid in the left portion of the first transverse cylinder 182a is prevented from leaving by the combination effect of the seventh check valve 174g and by the fifth counter balance valve 170e. The seventh check valve 174g only allows fluid to pass from the top side towards the bottom side of the seventh check valve 174g, as viewed in FIGS. 14 and 17. The fifth counter balance valve 170e does not allow fluid to pass from the bottom side of the fifth counter balance valve 170e to the top side of the fifth counter balance valve 170e. The sixth counter balance valve 170f and the sixth check valve 174f operate in a manner similar to their counterparts attached to the left side of the first transverse cylinder 182a, as viewed in FIG. 14.

The use of counter balance valves in a dual counter balance arrangement prevents the first transverse rod 184a from being displaced due to pressures exerted on the adjustable carriage assembly 90. This is necessary to prevent wind forces from causing the first transverse rod 184a to extend or retract without commands from the operator.

The fifth and the sixth pilot lines 172e and 172f are attached to the fifth and the sixth counter balance valves 170e, 170f. The fifth and sixth pilot lines 172e, 172f cause the fifth and the sixth counter balance valves 170e, 170f to allow fluid to pass when the load induced pressure exceeds a predetermined level.

The operation of the second transverse cylinder 182b when the transverse hydraulic cylinder switch 142 is positioned to use the third flow path 148 is the same as that described above for the first transverse cylinder 182a. Moreover, the third and the fourth counter balance valves 170c, 170d, the fourth and fifth check valves 174d, 174e, and the third and the fourth pilot lines 172c, 172d, serve the same function for the second transverse cylinder 182b as their counterparts serve for the first transverse cylinder 182a.

While a currently preferred embodiment of a possible hydraulic circuit for controlling the operation of the guide rail climbing lifting platform 10 has been described, it is understood by those of skill in the art from this disclosure that the present invention is not limited to any specific hydraulic circuit or control system. Nor is the invention limited to components having the specifications detailed above. For example, different numbers of hydraulic switches can be used, flow paths can be changed, counterbalance valve ratios can be varied, a flow divider can be omitted, a PLC could be added for enhanced control, other components can be added, etc. In addition, the size of the hydraulic cylinders can also be varied depending on the particular application for which the platform assembly 10 is being designed.

Figure 20:
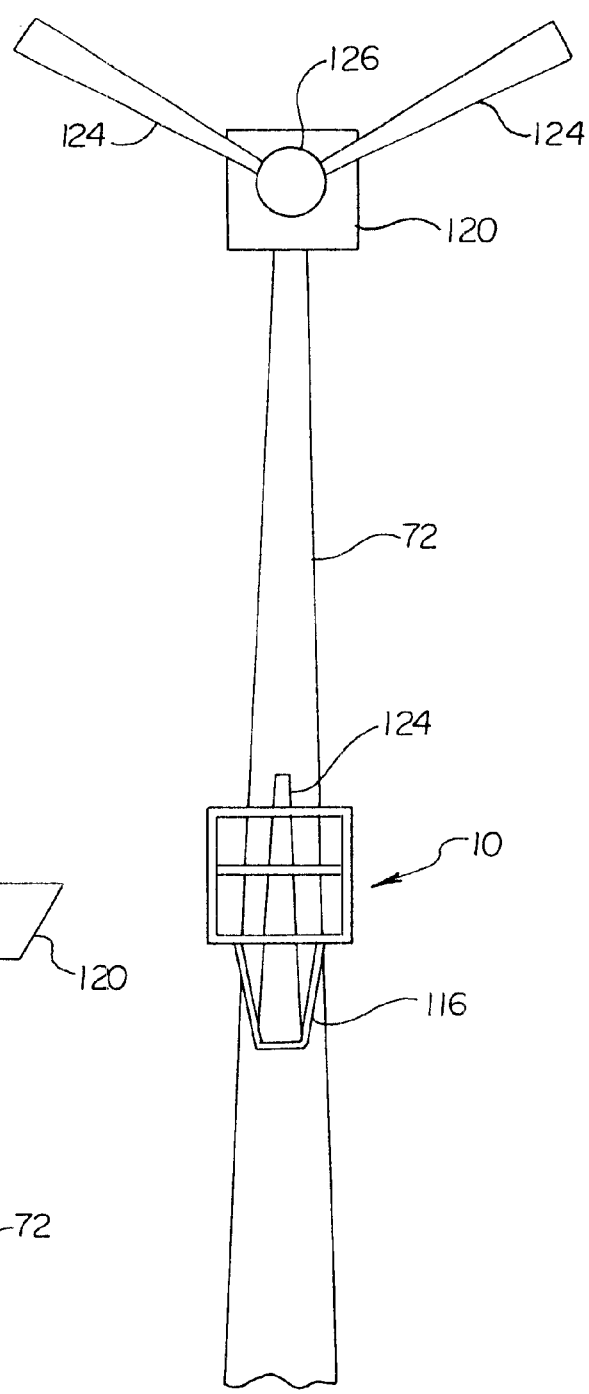
FIG. 20 is a front elevational view of the guide rail climbing lifting platform of FIG. 1, shown transporting a single rotor blade between the base of the tower and the rotor blade assembly.

The platform assembly 10 also simplifies the maintenance of wind turbine tubular towers 72 and their associated wind turbine generators. Wind turbine generators are often struck by lightning that can result in damage to either the steel tower 72, the nacelle 120, the wind turbine generator, or the rotor blades 124. Thus, necessitating the repair or replacement of various components of the steel tower 72, the wind turbine generator, or the rotor blades 124. The platform assembly 10 is capable of performing repairs more economically than repairs performed by a large industrial crane. FIG. 20 illustrates a replacement rotor blade 124 being transported upwards along a wind turbine tubular tower 72. The rotor 124 is connected to the platform assembly 10 using a saddle structure, or a swing structure, 116. This saddle structure 116 supports the lower end of the rotor blade 124 as viewed in FIG. 20. The portion of the rotor blade 124 that passes through the platform assembly 10 has at least one guide (not shown) attached to the platform assembly 10 and placed around a cross-section of the rotor blade 124. Thus, the lower end of the rotor blade 124 is able to be rotated about a pivot point formed by the guide (not shown). Additionally, the position of the rotor blade 124 can be adjusted vertically relative to the platform assembly 10 by adjusting the length of the sides of the saddle structure 116. Thus, once the rotor blade 124 is positioned proximate to the rotor 126, the top end of the rotor blade 124 can have its position adjusted to facilitate the attachment of the rotor blade 124 to the rotor 126. While in the preferred embodiment a saddle structure 116 and at least one guide are used to attach a rotor blade 124 to the platform assembly 10, it is understood from this disclosure by those of skill in the art that the present invention is not limited to any particular method of securing the rotor blade 124 to the platform assembly.

Thus, to replace a damaged rotor blade 124, the platform assembly 10 is brought to the base of the wind turbine tubular tower 72 and attached to the guide rails 40 that remained attached to the wind turbine tubular tower 72.

After the platform assembly 10 is secured to the guide rails 40, the rotor 126 is rotated so that the damaged rotor blade 124 points towards the ground. After the damaged rotor blade 124 has been properly positioned, as shown in FIG. 21, the rotor 126 is locked in position. This prevents the remaining rotor blades 124 from swinging downwards after the damaged rotor blade 124 is removed. Afterwards, an operator raises the platform assembly 10 to the top of the wind turbine tubular tower.

Then, workers secure the damaged rotor blade 124 to the platform assembly 10 and detach the rotor blade 124 from the rotor 126 (FIG. 21 illustrates a rotor blade 124 secured to the platform assembly 10 and ready for either attaching to or detaching from the rotor 126).

After the rotor blade 124 is detached from the rotor 126, an operator lowers the platform assembly 10 to the base of the wind turbine tubular tower 72. Then, workers remove the damaged rotor blade 124 and attach a replacement rotor blade 124 to the platform assembly 10.

Once the replacement blade is attached to the platform assembly 10, as described above, an operator again raises the platform assembly 10 to the top of the wind turbine tubular tower 72, as shown in FIG. 20. After the platform assembly 10 has reached the top of the tower 72, workers attach the replacement rotor blade 124 to the rotor 126 as shown in FIG. 21. Then, the rotor blade 124 is detached from the platform assembly 10 and the platform assembly is again lowered to the base of the wind turbine tubular tower.

Referring to FIGS. 1–21, the guide rail climbing lifting platform 10 operates as follows. Initially, a small crane (not shown) is used to place the lowermost tower segment 84 on the ground. The guide rails 40 are already installed on the lowermost tower segment. Next, the platform assembly 10 is attached to the guide rails 40 and positioned proximate to the base of the partially assembled steel tower 72, as shown in FIG. 1. The first and second latch pins 46a, 46b are engaged with the guide rails 40. The first and second slide pins 48a, 48b are also engaged with the guide rails 40 while the first and second lifting rods 43a, 43b are fully extended, as shown in FIG. 3.

Before the next or second from the ground tower segment 84 is positioned on the adjustable carriage assembly 90, the first and second transverse rods 184a, 184b are attached to the carriage assembly 90 using sliding blocks 106. The sliding blocks 106 are attached to the sliding block receiving holes 108 closest to the tower 72. This causes the adjustable carriage assembly to be securely positioned on the platform assembly 10.

Then, a small crane places the next tower segment 84 (or another additional tower component) onto the adjustable carriage assembly 90. The tower segment 84 has bolt-on brackets 94 that engage the adjustable carriage assembly 90 to vertically support the tower segment 84.

Afterwards, the latch pin hydraulic switch 140 is moved out of its biased position and into a position using a first flow path 144. The causes fluid to be pumped to the first and second latch pin cylinders 162a, 162b to force the first and second latch pins 46a, 46b to retract inside of the first and second latch pin cylinders 162a, 162b, thereby compressing the first and second latch pin biasing elements 164a, 164b. Thus, the first and second latch pins 46a, 46b are disengaged from the guide rails 40.

Then, the first and second lift cylinder hydraulic switches 134, 136 are moved out of their biased positions and into positions using the first flow path 144. This causes fluid to be pumped to the first and second lift cylinders 42a, 42b to cause the first and second lift rods 43a, 43b to retract inside of the first and second lift cylinder 142a, 142b. As the first and second lift rods 43a, 43b are retracted, the platform assembly 10 is moved upwards.

The platform assembly 10 continues to move upwards until the first and second lift rods 43a, 43b are retracted. Once the platform assembly has moved upwards approximately 10 feet, the first and second lift rods 43a, 43b are fully retracted and the platform assembly 10 stops moving upward.

Next, the latch pin hydraulic switch 140 is returned to its biased position that uses the second flow path 146. This causes fluid to be pumped to the first and second latch pin cylinders 162a, 162b to force the first and second latch pins 46a, 46b to extend outwards from the first and second latch pin cylinders 162a, 162b and engage the guide rails 40.

Once the first and second latch pins 46a, 46b are engaged with the pin receiving holes 70 in the guide rails 40, the slide pin hydraulic switch 138 is moved out of its biased position and into a position that uses the first flow path 144. This causes fluid to be pumped to the first and second slide pin cylinders 166a, 166b causing the first and second slide pins 48a, 48b to retract into the first and second slide pin cylinders 166a, 166b and to disengage from the guide rails 40.

Then, the first and second lift cylinder hydraulic switches 134, 136 are moved into a position using the second flow path 146. This causes fluid to be pumped into the first and second lift cylinders 42a, 42b pushing the first and second lifting rods 43a, 43b upwards and causing the slide assembly 55 to move upwards along the guide rails 40. Once the slide assembly 55 has been moved upwards along the guide rails 40 approximately 10 feet, the first and second slide pins 48a, 48b are aligned with the next set of pin receiving holes 70 in the guide rails 40.

Then, the slide pin hydraulic switch 138 is moved into its biased position that uses the second flow path 146 to cause the first and second slide pins 48a, 48b to engage the guide rails 40. The above process is repeated until the guide rail climbing lifting platform reaches the top of the partially constructed steel tower 72, as shown in FIG. 1.

Once the guide rail climbing lifting platform reaches the top of the partially constructed steel tower 72, the transverse cylinder hydraulic switch 142 is moved out of its biased position and into a position that uses the first flow path 144 to pump fluid into the first and second transverse cylinders 182a, 182b. This causes the first and second transverse rods 184a, 184b to extend outward from the first and second transverse cylinders 182a, 182b to force the adjustable carriage assembly 90, as shown in FIG. 2, to move to the right. Once the first and second transverse rods 184a, 184b are fully extended, a worker repositions one of the sliding blocks 106 to engage a sliding block receiving hole 108 that is closer to the first transverse cylinder 182a.

Once one of the transverse rods has had its sliding block 106 adjusted to engage a sliding block receiving hole 108 that is closer to the transverse cylinder, the same procedure is repeated for the other transverse rod. After both the first and second transverse rods 184a, 184b are adjusted to engage a closer sliding block receiving hole 108 via their respective sliding blocks 106, the first and second transverse rods 184a, 184b are again extended to push the adjustable carriage assembly 90 further to the right, as viewed in FIG. 2. This procedure is continued until the center line 73 of the tower segment 84 is aligned with the center line 73 of the partially constructed steel tower 72.

After the additional tower segment 84 is properly positioned over the partially constructed steel tower 72, the bearing contacts 94a on the bottom of the bolt-on brackets 94 allow the tower segment 84 to be rotated approximately 5–10 degrees in order to align the bolt holes 74 in the inner flange 86 of the tower segment 84 with the bolt holes 74 in the inner flange 86 of the top portion of the partially constructed tower 72.

When the tower segment 84 is properly aligned with the partially constructed steel tower 72, using the lifting rods 43a, 43b, the platform assembly 90 is lowered to bring the tower segment 84 into contact with the steel tower 72. Then, workers secure the additional tower segment 84 to the steel tower 72 using bolts and the guide rails 40 are secured in alignment with each other. The lifting platform 10 is then lowered to the ground using the same procedure described above whereupon the next tower segment 84 is loaded on the carriage assembly 90 by the small crane. The next tower segment 84 is then raised to the top of partially constructed tower 72 and put in place as the next tower segment, using the same procedure described above. This process is repeated until all of the tower segments 84 are in place to make up the steel tower 72. Lastly the nacelle 120 and other elements of the wind turbine, such as the rotor and rotor blades 124 (shown in FIGS. 18–21), are raised to the top of the steel tower 72 and installed.

As described above, the guide rail climbing lifting platform 10 greatly simplifies the erecting of modular towers for use as wind turbine tubular towers. Furthermore, the guide rail climbing lifting platform 10 is ideal for the lifting of the wind turbine generators including the nacelle 120, rotor 126, rotor blades 124, replacement parts, and repair parts to the top of the wind turbine tubular towers and is capable of further simplifying later repairs to the wind turbine generators.

The guide rail and climbing lifting platform as described may be used in connection with tower construction, repair and maintenance generally and is not limited to wind turbine towers. The use of the term "tubular towers" herein is intended to refer to towers which have a hollow interior and includes cross-sectional tubes that may be of any configuration, including but not limited to square and round cross-sections. Of course, it is generally contemplated that the tower may be smaller in diameter as it increases in height such that "tubular towers" also encompasses straight walled and tapering walled towers. The term "tubular towers" as used herein also includes open towers made of girders so long as guide wires are not in the way. In fact, the benefits of the invention may be achieved with any free standing structure where guide wires would not interfere with the platform movement.

The invention is also suited for off-shore wind towers since the system would only require a conventional work barge and standard crane rather than an extremely expensive ocean going vessel with a permanently mounted large crane.

It should be noted that the system can be used to lay down its own rails or to remove the rails after completion of the erection if aesthetics dictate removal. The rails may be reinstalled later for maintenance if required.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A tower comprising in combination:
   a) a plurality of generally tubular tower sections each having a top and a bottom, including a lower tubular tower section to be anchored to the ground and at least one higher tubular tower section constructed and arranged to be securable on top of a lower tower section;
   b) each said tubular tower section including a guide rail extending from said bottom to said top and being constructed and arranged such that stacked and secured tubular tower sections may be arranged such that the guide rail is continuous from the bottom to the top of the tower thus formed;
   c) a guide rail climbing lifting platform attachable to said guide rails with a carriage track system, said platform including a climbing mechanism for raising and lowering said platform on said guide rails and for securing said carriage track system to said guide rails, said platform further including a carriage assembly for carrying items up and down said tower;
   d) an apparatus for moving said carriage assembly horizontally over the top of said tower and for raising and lowering said carriage assembly when positioned over said tower.

2. The tower of claim 1 further including a wind turbine generator connected atop the higher tubular tower section.

3. The tower of claim 1 wherein said climbing mechanism includes a lower pair of latch pins on said platform which engage with pin receiving holes in said rails and a pair of lift cylinders having lower and upper ends, the lower ends of said lift cylinders being mounted to said lift platform and said upper end of said lift cylinders being slidably connected to said guide rail, said upper end of said lift cylinders being securable to said guide rail pin receiving holes via an upper pair of latch pins.

4. The tower of claim 3 wherein said lift cylinders are controlled by a hydraulic control mechanism that causes said lift cylinders to extend and retract and said upper and lower pins to engage and disengage alternatively such that said platform may be driven up and down said guide rails with one set of latch pins always being latched to said guide rail pin receiving holes.

5. The tower of claim 1 wherein said climbing mechanism includes a plurality of latch pins constructed and arranged to engage with said guide rail, said latch pins being controlled by a hydraulic control mechanism which lifts and lowers said platform on said rail with at least one latch pin always being secured to said guide rail.

6. The tower of claim 1 wherein a payload on said platform is carried by said guide rails to a base on which said tower is erected by mounting the lowermost rails against said base.

7. A vertically oriented tower having a series of interconnected modular tubular tower sections along a vertical height connected by joints, each said tubular tower section including a guide rail aligned with a guide rail from an adjacent tubular tower section such that a continuous guide rail extends from the bottom to the top of said tower, said tower including a guide rail climbing lifting platform attachable to said guide rail and including a mechanism for moving along said guide rail, said platform defining a carriage assembly to which items may be placed for delivery up or down said tower, said tower including an apparatus for moving said carriage assembly over the top of said tower.

8. A kit for adapting structures to include a guide rail and guide rail lifting platform system comprising:
   a) a plurality of guide rail sections each having mechanisms for attaching the guide rail sections to a structure;
   b) a guide rail climbing lifting platform attachable to said guide rail and including a mechanism for moving along said guide rail, said platform defining a carriage assembly to which items may be placed for delivery up or down said structure, said kit including an apparatus for moving said carriage assembly over the top of said structure.

9. The kit of claim 8 wherein said structure is a tower.

10. A method for building towers comprising the steps of:
    a) preparing a base;
    b) erecting a first generally tubular section on said base, said tubular section including a guide rail along its length;
    c) attaching a guide rail climbing lifting platform to said guide rail, said platform including a mechanism for moving along said guide rail, said platform defining a carriage assembly to which items may be placed for delivery up or down said tower;
    d) placing another tubular section onto said carriage assembly and lifting said platform on said guide rails and sliding said another tubular section over the top of said first tubular section and securing said sections together; and
    e) lowering said platform to receive another tubular section and repeating said process until the desired tower height is achieved.

11. A method for servicing wind generating towers comprising the steps of:
    a) attaching a guide rail to the outside of the tower;
    b) attaching a guide rail climbing lifting platform to said guide rail, said platform including a mechanism for moving along said guide rail, said platform defining a carriage assembly to which items may be placed for delivery up or down said tower; and
    c) utilizing said platform to raise and lower wind generating turbine components on said tower.

12. A method for constructing wind generating towers comprising the steps of:
    a) preparing a base;
    b) erecting a first generally tubular section on said base, said tubular section including a guide rail along its length;
    c) attaching a guide rail climbing lifting platform to said guide rail, said platform including a mechanism for moving along said guide rail, said platform defining a carriage assembly to which items may be placed for delivery up or down said tower;

d) placing another tubular section onto said carriage assembly and lifting said platform on said guide rails;

e) sliding said another tubular section over the top of said first tubular section and securing said sections together;

f) lowering said platform to receive another tubular section and repeating said process until the desired tower height is achieved; and g) lowering said platform to receive wind generating turbine components and raising each of said wind generating components on said platform to the top of said tower until all components are assembled.

13. A tower comprising in combination:

a) a plurality of generally tubular tower sections each having a top and a bottom, including a lower tubular tower section to be anchored to the ground and at least one higher tubular tower section constructed and arranged to be securable on top of a lower section;

b) each said tubular tower section including a guide rail extending from said bottom to said top and being constructed and arranged such that stacked and secured tubular tower sections may be arranged such that the guide rail is continuous from the bottom to the top of the tower thus formed; and c) a guide rail climbing lifting platform attachable to said guide rails with a carriage track system, said platform including a climbing mechanism for raising and lowering said platform on said guide rails and for securing said carriage track system to said guide rails, said platform including a carriage assembly for carrying items up and down said tower, said carriage assembly including apparatus for moving said carriage assembly horizontally over the top of said tower and for raising and lowering said carriage assembly when positioned over said tower.

* * * * *